(12) United States Patent
Sherman et al.

(10) Patent No.: US 12,536,212 B1
(45) Date of Patent: Jan. 27, 2026

(54) SYSTEMS AND METHODS FOR ERROR CORRECTION IN LARGE LANGUAGE MODEL-BASED DATABASE QUERYING

(71) Applicant: AJ Press, LLC, Sherman Oaks, CA (US)

(72) Inventors: Jacob Scott Sherman, Washington, DC (US); Rachel Schindler, New York, NY (US); Brandon Chiazza, Penfield, NY (US); Diego Fernando Martinez Ayala, Cundinamarca (CO)

(73) Assignee: AJ Press, LLC, Sherman Oaks, CA (US)

( * ) Notice: Subject to any disclaimer, the term of this patent is extended or adjusted under 35 U.S.C. 154(b) by 0 days.

(21) Appl. No.: 19/221,873

(22) Filed: May 29, 2025

(51) Int. Cl.
    *G06F 16/334* (2025.01)
(52) U.S. Cl.
    CPC ................ *G06F 16/3344* (2019.01)
(58) Field of Classification Search
    CPC .................................. G06F 16/3344
    See application file for complete search history.

(56) References Cited

U.S. PATENT DOCUMENTS

2024/0403789 A1* 12/2024 Menon .............. G06Q 10/06311
2025/0117627 A1*  4/2025 Lo .................... G06N 3/0455

* cited by examiner

*Primary Examiner* — Van H Oberly
(74) *Attorney, Agent, or Firm* — Greenberg Traurig, LLP

(57) ABSTRACT

A system and method for querying, processing, and ranking governmental data across heterogeneous databases may include integrating large language models (LLMs) and multi-agent orchestration to enhance accuracy and mitigate bias. The system receives a natural language query, processes the query using an agent orchestration LLM to generate search query instructions, and executes specialized data record processing agents to retrieve data from diverse sources, including relational, vector, and graph databases. A plurality of candidate natural language responses is generated and validated by data verification LLMs based on relevance and accuracy metrics to reduce hallucinations. The system further employs cross-source validation, statistical and linguistic consistency analyses, and weighted scoring to refine responses, which may include textual summaries, tables, or downloadable files presented via a graphical user interface. Accordingly, the approach ensures precise and contextually relevant results, particularly for applications involving sensitive or regulated data such as legislative and governmental records.

18 Claims, 11 Drawing Sheets

SYSTEMS AND METHODS FOR ERROR CORRECTION IN LARGE LANGUAGE MODEL-BASED DATABASE QUERYING

FIELD OF TECHNOLOGY

The present disclosure generally relates to computer-based systems configured for reducing model output bias in querying, processing, and ranking governmental data across heterogeneous databases and methods of use thereof.

BACKGROUND OF TECHNOLOGY

Digital information retrieval systems typically utilize a combination of machine learning techniques and heuristic search algorithms. These systems are often implemented as isolated, task-specific modules, requiring substantial coordination and resource management to integrate various outputs into a unified result. Moreover, numerous industries demand strict compliance with established guidelines and regulatory standards, thereby underscoring ongoing challenges in achieving both efficient processing and dependable accuracy.

SUMMARY

In some embodiments, the present disclosure provides a method for retrieving and verifying information associated with a data record that includes an attribute associated with an entity. The method comprises, by at least one processor, receiving a user query comprising a natural language request, inputting the natural language request into an agent orchestration large language model that generates a plurality of search query instructions for a data record processing agent, and executing the data record processing agent—which comprises a data record identification machine learning model—to search multiple data sources based on the search query instructions so as to output corresponding search query responses containing data associated with the entity. The search query responses, together with the original natural language request, are further processed by the agent orchestration model to produce candidate natural language responses. Thereafter, a data verification large language model, or a plurality thereof, is configured to evaluate these candidate responses and select a verified response that satisfies predetermined relevance and accuracy metrics to mitigate hallucinations. In some embodiments, the method further comprises validating data from multiple data record processing agents, assigning weightings to their outputs, and applying statistical as well as linguistic consistency analyses, wherein the candidate responses may be presented as textual summaries, tables, downloadable files, or any combination thereof, and wherein the retrieved data may include governmental data from various sources. The verified response is then output for display on a graphical user interface rendered on the user computing device.

In some embodiments, the present disclosure provides a system that includes at least one processor in communication with a non-transitory computer readable medium storing software instructions. The at least one processor is configured to, when executing the instructions, receive a user query comprising a natural language request to retrieve information regarding a data record that includes an attribute of an entity, input the natural language request into an agent orchestration large language model that outputs search query instructions for a data record processing agent, and execute the data record processing agent—which features a data record identification machine learning model—to search an array of data sources based on the generated instructions so as to output corresponding search query responses. The search query responses, together with the original request, are subsequently input into the agent orchestration model to generate candidate natural language responses. The at least one processor may then employ a data verification large language model, or a plurality thereof, to select a verified response that is most relevant and accurate relative to the data record based on established relevance and accuracy metrics. Additionally, the system may be configured to validate data across several data record processing agents, to assign weightings to each agent's outputs, and to utilize both statistical and linguistic consistency analyses to refine the candidate responses; wherein in some embodiments the candidate responses include various formats such as textual summaries, tables, or downloadable files, and wherein the underlying data may comprise governmental records from multiple sources. The at least one processor then provides the verified natural language response to a graphical user interface on the user computing device.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
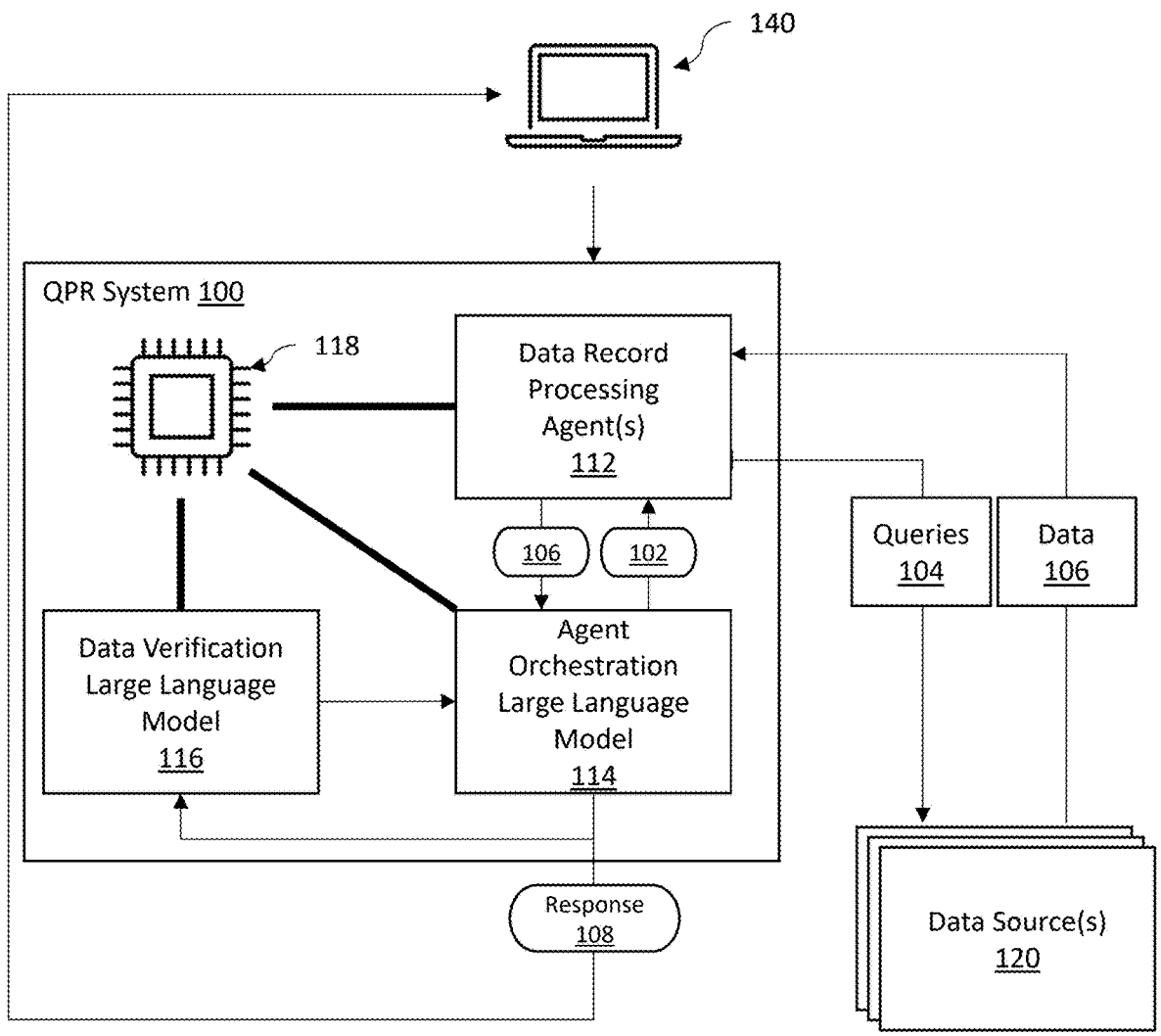
FIG. 1 is a schematic block diagram illustrating the QPR System for querying, processing, and ranking data across heterogeneous databases in accordance with one or more embodiments of the present disclosure.

Various detailed embodiments of the present disclosure, taken in conjunction with the accompanying FIGS., are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

The problem domain addressed by the present system lies in the field of intelligent data retrieval and processing frameworks, particularly those designed to query, process, and rank heterogeneous data sources, such as legislative, regulatory, and governmental records. Conventional systems for information retrieval often rely on isolated, task-specific modules that lack integration and coordination, leading to inefficiencies and inaccuracies. These systems typically employ heuristic search algorithms or basic machine learning techniques, which are constrained in their ability to dynamically adapt to evolving data structures, mitigate bias, or ensure the precision of responses. Additionally, existing retrieval systems face challenges in managing the complexity of combining structured and unstructured data sources, such as relational databases, vector databases, and graph databases, in a unified and contextually relevant manner. This challenge is particularly significant in domains requiring strict adherence to regulatory standards and high levels of precision, such as legislative data analysis.

The inventive concept disclosed herein overcomes these limitations by introducing a multi-agent orchestration system that integrates large language models (LLMs), retrieval augmentation generation (RAG) techniques, and dynamic graph database architectures. The system employs a fleet of specialized agents, including structured data agents, unstructured data agents, and fallback handlers, to intelligently route user queries based on their semantic intent. By leveraging a graph-based ontology framework, the system dynamically enriches user queries with metadata extracted from interconnected data sources, ensuring that responses are both contextually relevant and accurate. Additionally, the system incorporates multi-agent validation mechanisms to mitigate bias and reduce hallucinations in LLM-generated responses. This is achieved through cross-source verification, statistical consistency analysis, and linguistic consistency analysis, which collectively ensure fidelity to facts and minimize inaccuracies.

The technical solution further includes real-time ontology updates, enabling the system to adapt to new legislative data, such as congressional records, amendments, and regulatory filings, with minimal human intervention. The architecture is designed to harmonize structured and unstructured data retrieval processes, employing hybrid retrieval techniques that combine semantic search with exact word-match queries. This approach ensures comprehensive and precise results, even for complex queries. Moreover, the system utilizes advanced relevance scoring algorithms and machine learning models to rank query responses based on their alignment with the original user query, enhancing the overall user experience.

In summary, the disclosed system provides a robust and scalable solution to the challenges of querying, processing, and ranking heterogeneous data sources. By integrating specialized algorithms, LLM-based agents, and dynamic system architecture, the described approach achieves significant improvements in accuracy, efficiency, and bias mitigation, offering a transformative method for legislative data analysis and retrieval.

Techniques herein further addresses challenges detailed above, and others, by implementing a multi-query and multi-agent data validation framework that integrates large language models (LLMs), retrieval augmentation generation (RAG) techniques, and dynamic graph database architectures. The system employs a fleet of reasoning agents for validation, as well as multi-query generation to test candidate queries and response and to validate based on a validation framework.

The validation framework can include cross-source verification by comparing responses generated by different agents. This includes structured data from relational databases, unstructured data from vector databases, and metadata from graph databases. The validation process ensures consistency and accuracy by identifying discrepancies and reconciling conflicting information.

The validation framework can include multi-agent collaboration where specialized agents collaborate to validate data by leveraging their unique capabilities. For example, structured data agents focus on exact matches and schema-based validation, while unstructured data agents employ semantic search and embedding-based techniques. Fallback handlers address out-of-scope queries, ensuring comprehensive coverage.

The validation framework can include statistical and/or linguistic consistency analysis to detect and mitigate hallucinations in LLM-generated responses. These mechanisms evaluate the coherence and factual alignment of responses across multiple queries.

The validation framework can include dynamic ontology updates that includes updating the graph-based ontology framework to incorporate new legislative data, such as amendments and regulatory filings. This ensures that the validation process remains current and relevant, even as data sources evolve.

The validation framework can include weighted scoring and ranking where responses are scored and ranked based on relevance and accuracy metrics. The weighted scoring and ranking can assign weights to data sources and agents, prioritizing those with higher reliability and contextual alignment. This ensures that the most accurate and relevant responses are presented to the user.

The validation framework can include multi-query validation workflow that processes multiple queries simultaneously. Each query can be an independently generated candidate that causes a corresponding search of one or more data sources such that the data returned in response to each candidate can be tested, validated and ranked to ensure validity.

Techniques herein include a system to process natural language queries by leveraging an agent orchestration large language model (LLM) to dynamically generate search query instructions tailored to the semantic intent of the user-provided query. This arrangement ensures that the query is routed to specialized data record processing agents capable of interacting with heterogeneous data sources, such as relational, vector, and graph databases. By dynamically generating query instructions based on trained parameters, the system adapts to the structure and type of data being queried, improving the precision and relevance of the retrieved information.

The integration of multiple data record processing agents allows the system to handle diverse data formats and sources, ensuring comprehensive query coverage. Each agent processes the query instructions to produce search query responses that correspond to specific attributes or entities within the data records. This modular approach enhances scalability and efficiency, as the system can allocate processing resources based on the complexity and scope of the query.

The use of an agent orchestration LLM to generate candidate natural language responses from the search query responses ensures that the system provides user-friendly outputs that align with the original query intent. By employing a data verification LLM to validate these candidate responses, the system mitigates inaccuracies and hallucinations, ensuring that the final response is both relevant and factually accurate. This validation process incorporates relevance and accuracy metrics, which are important for maintaining the integrity of the system's outputs, particularly in applications involving sensitive or regulated data, such as governmental records.

The graphical user interface (GUI) further enhances the practical application of the system by presenting the verified response in an accessible format. This arrangement reduces the cognitive load on the user by providing clear and concise information, thereby improving the overall user experience. Additionally, the system's ability to dynamically adapt to user queries and validate responses ensures effective handling of complex and evolving data environments, making the system appropriate for high-precision domains such as legislative data analysis.

Techniques herein include multiple data verification large language models (LLMs) are utilized to independently verify candidate natural language responses, and the verified response is selected based on the majority agreement among the models.

This arrangement ensures redundancy and robustness in the validation process by leveraging multiple LLMs trained on distinct datasets or methodologies. By comparing the outputs of multiple models, the system can identify and prioritize responses that are consistently validated across diverse verification mechanisms, reducing the likelihood of errors or hallucinations in the final output.

The use of majority agreement introduces a consensus-based approach to response validation, which mitigates the impact of individual model biases or inaccuracies. This approach is especially beneficial in scenarios involving sensitive or regulated data, such as governmental records, where factual accuracy and reliability are of significant importance.

Additionally, the distributed validation process enhances the scalability of the system, as multiple LLMs can operate in parallel, ensuring timely processing of complex queries without compromising the quality of the response. This approach also provides a framework for integrating future models or verification techniques, allowing the system to adapt to evolving data validation requirements.

In practical applications, this method improves the reliability of responses presented to the user, ensuring that the information aligns with the original query intent and adheres to factual standards, thereby enhancing user trust and system credibility.

Techniques herein include selecting a verified natural language response from a plurality of candidate responses by leveraging multiple data verification large language models (LLMs). Each LLM independently verifies the candidate responses, and the verified response is selected based on the majority agreement among the models.

The arrangement of multiple data verification LLMs ensures redundancy and robustness in the validation process. By comparing outputs from multiple models, discrepancies in individual model outputs are identified and mitigated, reducing the likelihood of errors or hallucinations in the final response. This consensus-based approach introduces a systematic mechanism for prioritizing responses that are consistently validated across diverse verification mechanisms, thereby enhancing the reliability and factual accuracy of the system's outputs.

The use of majority agreement among the LLMs provides a scalable and efficient method for determining the most accurate response. This approach minimizes the impact of biases or inaccuracies present in any single model, ensuring that the final response aligns closely with the user's query intent and the underlying data records. Additionally, the distributed validation process allows parallel operation of multiple LLMs, enabling timely processing of complex queries without compromising the quality of the response.

In practical applications, this method improves the credibility and trustworthiness of the system, particularly in domains involving sensitive or regulated data, such as governmental records. By ensuring that the verified response is both relevant and accurate, the system enhances user confidence and supports high-precision decision-making processes.

Techniques herein include a data verification large language model selects a verified response from a plurality of candidate natural language responses based on a weighting of each data source.

The arrangement ensures that responses are prioritized based on the reliability and contextual alignment of the data sources. By assigning weights to data sources, the system can account for variations in data quality, relevance, and trustworthiness, enabling the selection of the most accurate and contextually appropriate response. This approach mitigates the risk of inaccuracies or biases that may arise from relying on less reliable data sources, thereby improving the overall fidelity of the system's outputs.

The weighting mechanism introduces a dynamic evaluation layer that adapts to the characteristics of the data sources, such as their historical accuracy, domain specificity, or user-defined preferences. This adaptability enables the system to refine its response generation process for various applications, such as legislative data analysis, where precision and adherence to regulatory standards are of significant importance.

In practical implementation, the weighting of data sources can be adjusted based on feedback loops or predefined metrics, ensuring that the system remains responsive to evolving data environments. For example, a legislative database with verified congressional records may be assigned a higher weight compared to a general-purpose database, ensuring that the system prioritizes well-regarded sources for sensitive queries. This arrangement enhances the system's ability to deliver reliable and relevant responses across diverse use cases.

Techniques herein include validating data associated with an entity by comparing the outputs from multiple data record processing agents. This validation process ensures consistency and accuracy across diverse data sources. The described validation mechanism enables the system to reconcile discrepancies between data retrieved from different agents, such as structured data agents and unstructured data agents. By cross-referencing the outputs, the system identifies conflicting information and resolves inconsistencies, ensuring that the final data presented to the user is reliable and accurate. This approach is particularly beneficial in scenarios involving heterogeneous data sources, such as relational databases, vector databases, and graph databases, where data formats and structures may vary significantly.

The arrangement of multiple data record processing agents allows the system to leverage the distinct functionalities of each agent. For example, structured data agents focus on schema-based validation, while unstructured data agents employ semantic search techniques. By validating the data across these varied agents, the system ensures thorough coverage and reduces the likelihood of errors or omissions.

This validation process also mitigates the risk of bias or inaccuracies that may arise from relying on a single data source or agent. By incorporating multiple agents into the validation framework, the system enhances the robustness of data processing capabilities, making the framework suitable for applications requiring high precision, such as legislative data analysis.

In practical implementation, this method improves the reliability of the system's outputs, ensuring that the data aligns with the user's query intent and adheres to factual standards. For example, when querying legislative records, the system can validate voting data retrieved from a relational database against metadata extracted from a graph database, ensuring that the information is both accurate and contextually relevant.

Techniques herein include determining a weighting for each data record processing agent, applying the weighting to the data returned by each agent, and scoring the data to determine verified data associated with an entity. The arrangement of assigning weights to data record processing agents introduces a dynamic evaluation mechanism that accounts for variations in the reliability, relevance, and contextual alignment of data sources. By applying these weights, the system ensures that data from more trustworthy or contextually appropriate agents is prioritized, reducing the influence of less reliable sources. This approach mitigates inaccuracies and biases that may arise from unweighted aggregation of data, thereby improving the fidelity of the system's outputs.

The scoring mechanism further refines the verification process by quantifying the reliability of data based on the assigned weights. This ensures that the final verified data presented to the user is both accurate and contextually relevant, aligning closely with the semantic intent of the user query. For example, in legislative data analysis, data from a verified congressional record may be assigned a higher weight compared to data from a general-purpose database, ensuring that the system prioritizes well-regarded sources for sensitive queries.

This method also enhances scalability and efficiency by enabling the system to dynamically adapt to varying data environments. As new data sources or agents are introduced, the associated weights can be adjusted based on historical accuracy or user-defined preferences, allowing the system to maintain precision in responses without requiring extensive manual intervention.

In some embodiments, validation of each candidate response can use linguistic consistency analysis. to evaluate the coherence and reliability of candidate natural language responses generated by the system. This approach ensures that the responses align with the data associated with the queried entity and the semantic intent of the user-provided query.

By incorporating statistical consistency analysis, the system can detect discrepancies or anomalies in the candidate responses, such as outliers or conflicting data points, which may indicate inaccuracies or hallucinations in the generated outputs. This evaluation process leverages statistical methods to compare the responses against expected patterns or distributions derived from the underlying data records, ensuring that the responses are factually grounded and contextually appropriate.

The statistical consistency analysis is implemented as an additional validation layer within the system's workflow, complementing other verification mechanisms. This arrangement enhances the reliability of the system by systematically identifying and mitigating errors that may arise from the limitations associated with large language models or the complexity of heterogeneous data sources. For example, when querying legislative data, the system can use statistical metrics to verify that the response aligns with historical voting patterns or legislative trends, thereby improving the precision and trustworthiness of the output.

This feature is particularly advantageous in applications involving sensitive or regulated data, such as governmental records, where accuracy and consistency are of significant importance. By ensuring that the responses adhere to statistical norms and factual standards, the system reduces the risk of presenting misleading or biased information to the user.

In some embodiments, validation of each candidate response can use linguistic consistency analysis. By utilizing linguistic consistency analysis, the system ensures that candidate natural language responses align with the semantic intent of the user-provided query and the underlying data associated with the queried entity. This process evaluates the coherence and grammatical structure of the responses, identifying discrepancies or ambiguities that may arise from the limitations of large language models or the complexity of heterogeneous data sources.

The linguistic consistency analysis operates as an additional validation layer, complementing other verification mechanisms, such as statistical consistency analysis, to refine the accuracy and reliability of the system's outputs. By systematically analyzing linguistic patterns, the system can detect and mitigate hallucinations or irrelevant information in the generated responses, ensuring that the final output is both contextually appropriate and factually grounded.

This arrangement is particularly advantageous in applications involving sensitive or regulated data, such as governmental records, where precision and clarity are of significant importance. For example, when responding to a query about legislative voting patterns, the system can verify that the language used in the response accurately reflects the relationships and context of the data, such as the alignment of voting records with party affiliations or historical trends. This enhances the trustworthiness and usability of the system's outputs, supporting decision-making processes that require a high degree of accuracy.

Based on such technical features, further technical benefits become available to users and operators of these systems and methods. Moreover, various practical applications of the disclosed technology are also described, which provide further practical benefits to users and operators that are also new and useful improvements in the art.

FIG. 1 is a schematic block diagram illustrating the QPR System for querying, processing, and ranking data across heterogeneous databases in accordance with one or more embodiments of the present disclosure.

In some embodiments, a querying, processing, and ranking (QPR) System 100 may serve as the central framework for querying, processing, and ranking data across heterogeneous databases. In some embodiments, the QPR System 100 may integrate multiple specialized components, including but not limited to the Data Record Processing Agent(s) 112, the Agent Orchestration Large Language Model (LLM) 114, and the Data Verification Large Language Model (LLM) 116, to facilitate efficient and accurate data retrieval and validation. In some embodiments, the QPR System 100 may be configured to handle both structured and unstructured data queries by leveraging advanced machine learning models in conjunction with multi-agent orchestration techniques. Accordingly, the system may operate within a computational environment, which comprises a processor 118 and memory resources, to execute complex workflows involving query optimization, data validation, and response generation.

In some embodiments, the QPR System 100 may interact with external Data Source(s) 120 to retrieve relevant information and process user-provided queries 104 to generate a selected response 108. In some embodiments, the system may be dynamically configured to adapt to evolving data structures and user requirements, thereby ensuring high precision and relevance in outputs.

In some embodiments, the Data Record Processing Agent(s) 112 may be specialized modules within the QPR System 100 that are responsible for executing search query instructions generated by the Agent Orchestration LLM 114. In some embodiments, each Data Record Processing Agent 112 may incorporate a Data Record Identification Machine Learning Model that is trained to interact with a variety of data sources, including relational, vector, and graph databases. Accordingly, the Data Record Processing Agent(s) 112 may be configured to receive Search Query Instructions 102 from the Agent Orchestration LLM 114 and execute these instructions to retrieve data records from the Data Source(s) 120. In some embodiments, the retrieved data records may subsequently be processed into Search Query Responses that, in turn, may be forwarded to the Agent Orchestration LLM 114 for further refinement. Furthermore, in some embodiments, the Data Record Processing Agent(s) 112 may be designed to handle both structured data from relational databases and unstructured data from vector databases, thus ensuring comprehensive query coverage. In some embodiments, these agents may also incorporate mechanisms for schema-based validation and semantic search to enable precise and contextually relevant data retrieval.

In some embodiments, the Data Record Processing Agent(s) 112 may be implemented as communication interface and adapter components designed to facilitate seamless interaction between the QPR System 100 and the heterogeneous data sources 120. These agents act as intermediaries, ensuring that the system can effectively query, retrieve, and process data from diverse repositories, including relational databases, vector databases, and graph databases, regardless of their underlying architecture or communication protocols.

In some embodiments, the communication interface component of the Data Record Processing Agent(s) 112 is responsible for establishing and maintaining connections with the data sources 120. This interface may support various communication protocols, such as REST APIs, SQL queries, GraphQL, or proprietary database connectors, enabling the system to interact with structured, unstructured, and graph-based data repositories. The communication interface ensures that the queries generated by the Agent Orchestration Large Language Model 114 are transmitted to the appropriate data sources in a format compatible with their respective protocols.

In some embodiments, the adapter component of the Data Record Processing Agent(s) 112 is designed to translate and adapt the data retrieved from the data sources 120 into a standardized format that can be processed by the QPR System 100. This component may include schema mapping, data normalization, and metadata extraction functionalities to harmonize the diverse data formats and structures encountered across different repositories. For example:

a. Relational Databases: The adapter may convert tabular data into structured JSON or XML formats for further processing.

b. Vector Databases: The adapter may extract embeddings and associated metadata, ensuring compatibility with the system's semantic search capabilities.

c. Graph Databases: The adapter may transform graph-based data into hierarchical or relational structures, preserving the relationships and context inherent in the data.

In some embodiments, the communication interface and adapter components work in tandem to execute the search query instructions 102 generated by the Agent Orchestration Large Language Model 114. The communication interface transmits the queries to the data sources 120, while the adapter component processes the returned data 106 to ensure it aligns with the semantic intent of the original user query 104. This modular design allows the Data Record Processing Agent(s) 112 to handle multiple queries simultaneously, ensuring scalability and efficiency in data retrieval.

In some embodiments, the adapter component may also include mechanisms for validating the retrieved data before it is forwarded to the Agent Orchestration Large Language Model 114. This validation may involve schema-based checks, consistency analysis, and metadata verification to ensure the accuracy and relevance of the data. Additionally, the communication interface may provide feedback to the Agent Orchestration Large Language Model 114 regarding the status of the queries, enabling dynamic adjustments to the query generation process.

In some embodiments, the Agent Orchestration LLM 114 may serve as a central element of the QPR System 100 that orchestrates the query processing workflow. In some embodiments, upon receiving a user-provided Query 104, the Agent Orchestration LLM 114 may generate Search Query Instructions 102 that are tailored to the semantic intent of the query. As a result, these instructions may be routed to the appropriate Data Record Processing Agent(s) 112 based on the type of data required. In some embodiments, the Agent Orchestration LLM 114 may further process Search Query Responses received from the Data Record Processing Agent(s) 112 to generate Candidate Natural Language Responses. In some embodiments, the model may leverage metadata extracted from the Data Source(s) 120 to enrich the query processing workflow, thereby enhancing the accuracy and relevance of the final output. As a result, the Candidate Natural Language Responses may be validated by the Data Verification LLM 116 to ensure compliance with predefined accuracy and relevance standards.

In some embodiments, the Agent Orchestration Large Language Model (LLM) 114 is configured to generate and provide multiple independent search query instructions 102 to perform parallel searches of the Data Source(s) 120. This embodiment enables the system to, in parallel, execute multiple searches based on the user's natural language query, with the results from each search being separately validated and ranked by the Data Verification LLM 116 to select the most valid result as the Selected Response 108.

In some embodiments, the user submits a natural language query 104 via the graphical user interface of the Computer 140. The query is processed by the Agent Orchestration LLM 114 to determine the semantic intent and scope of the request. The Agent Orchestration LLM 114 can generate multiple independent search query instructions 102 based on the natural language query 104 and the semantic intent and scope thereof. Due to the probabilistic nature of LLMs, and machine learning more broadly, each search query instruction 102 is likely to have variations to the search parameters, including different search attributes for structured data, unstructured data, vector data, etc., thus eliciting different returns from the data source(s) 120. Moreover, in some embodiments, each search query instruction 102 could be tailored to explore different aspects of the user's query, thus optimizing each search query instruction for different aspects of the user's request.

These instructions can be routed to the Data Record Processing Agent(s) 112, which can be configured to issue the search queries to the data source(s) 120 and obtain the return data 106 from the data source(s) 120. The Data Record Processing Agent(s) 112 execute the search query instructions 102 in parallel across the Data Source(s) 120. Each search query instruction can be directed to specific data sources, such as relational databases, vector databases, or graph databases, via a respective Data Record Processing Agent 112, ensuring comprehensive coverage of the query. The Return Data 106 from each parallel search is retrieved concurrently, reducing the overall response time. Each set of retrieved data corresponds to a specific search query instruction and is processed independently.

In some embodiments, the Data Verification LLM 116 validates the Return Data 106 from each parallel search independently. Validation includes can include cross-source verification, statistical consistency analysis, and linguistic consistency analysis to ensure the accuracy and relevance of the retrieved data, as detailed above. Each validated result can be assigned a relevance score and/or an accuracy score based on predefined metrics.

The Data Verification LLM 116 can rank the validated results from the parallel searches based on their relevance and accuracy scores. The ranking process ensures that the most valid and contextually appropriate result is prioritized. In some embodiments, the highest-ranked validated result is selected as the Selected Response 108. This ensures that the final response provided to the user is the most accurate and relevant result derived from the parallel searches.

In some embodiments, the Data Verification LLM 116 may function as a specialized validation module within the QPR System 100 to ensure the accuracy and relevance of the Candidate Natural Language Responses generated by the Agent Orchestration LLM 114. In some embodiments, the Data Verification LLM 116 may evaluate these candidate responses based on established relevance and accuracy metrics to mitigate hallucinations and reduce bias. In alignment with these objectives, the model may employ cross-source verification techniques, statistical consistency analysis, and linguistic consistency analysis to detect and reconcile discrepancies in the retrieved data. In some embodiments, the Data Verification LLM 116 may be configured to operate either independently or in collaboration with multiple verification models, thereby enabling consensus-based response validation. As a result, the verified response may be output as the Selected Response 108, which is then displayed on the graphical user interface of the user computing device 140 to provide the user with compliant, context-dependent information. In some embodiments, the Data Source(s) 120 may represent external repositories of data with which the QPR System 100 interacts to retrieve information. In some embodiments, these sources may include relational databases, vector databases, and graph databases, each containing structured, unstructured, or metadata-enriched data records. Accordingly, the Data Source(s) 120 may be accessed by the Data Record Processing Agent(s) 112 in accordance with the Search Query Instructions 102 generated by the Agent Orchestration LLM 114. In some embodiments, the data retrieved from these sources may be processed into Search Query Responses, which are subsequently refined and validated within the QPR System 100. In some embodiments, the Data Source(s) 120 may be dynamically updated to incorporate new legislative data, such as congressional records, amendments, and regulatory filings, thereby ensuring that the QPR System 100 remains current and relevant. Furthermore, in some embodiments, a hybrid retrieval technique may be implemented, combining semantic search with exact word-match queries to maximize precision and comprehensiveness during data retrieval.

In some embodiments, the Queries 104 may comprise user-provided natural language requests submitted to the QPR System 100 via the graphical user interface of the user computing device 140. In some embodiments, these queries may serve as the input for the Agent Orchestration LLM 114, which processes them to generate the Search Query Instructions 102. As a result, the Queries 104 may be enriched with metadata extracted from the Data Source(s) 120 to optimize the query processing workflow. In some embodiments, the enriched queries may be routed to the appropriate Data Record Processing Agent(s) 112 that execute the instructions to retrieve relevant data records from the Data Source(s) 120. In some embodiments, the Queries 104 may be designed to accommodate both structured and unstructured data requests, thereby enabling the QPR System 100 to address a wide range of user requirements. To achieve this, the system may employ advanced natural language understanding techniques to interpret the semantic intent of the Queries 104, ensuring that the generated responses align closely with the user's original request.

In some embodiments, the Return Data 106 may comprise the Search Query Responses generated by the Data Record Processing Agent(s) 112 in accordance with the Search Query Instructions 102. In some embodiments, each response may correspond to a specific instruction and contain data associated with the attributes of the queried entity. As a result, the Return Data 106 may be input into the Agent Orchestration LLM 114 for further processing, wherein the data may be transformed into Candidate Natural Language Responses. In some embodiments, before being output as the Selected Response 108, the Return Data 106 may be subsequently validated by the Data Verification LLM 116 to ensure its accuracy and relevance. As a result, the Return Data 106 may serve as an intermediate output that connects the data retrieval and response generation stages of the QPR System 100.

In certain embodiments, the Selected Response 108 may represent the concluding output of the QPR System 100, which is displayed on the graphical user interface of the user computing device 140. In certain embodiments, this response may constitute the verified natural language response generated by the Data Verification LLM 116, based on the Candidate Natural Language Responses produced by the Agent Orchestration LLM 114. As a result, the Selected Response 108 may be tailored to align with the user's original Query 104 and presented in various formats, such as textual summaries, tables, or downloadable files. In certain embodiments, the Selected Response 108 may be designed to be both accurate and contextually relevant, thereby ensuring alignment with user requirements and adherence to established relevance and accuracy metrics.

In some embodiments, the Computer 140 may be configured as the user computing device that interfaces with the QPR System 100 to submit Queries 104 and receive the Selected Response 108. In some embodiments, the Computer 140 may be equipped with a graphical user interface to facilitate seamless interaction with the QPR System 100. Accordingly, the device may communicate with the system via network protocols, thereby enabling real-time query processing and response generation. In some embodiments, the Computer 140 may serve as both the entry point for user queries and the endpoint for displaying the system's outputs, thereby ensuring an intuitive and user-friendly experience.

For example, for a user query such as "What are the latest legislative amendments related to renewable energy?", the Agent Orchestration LLM 114 may generate multiple independent search query instructions, each search query instruction including queries to respective data sources 120 to:
1. Retrieve data from relational databases containing legislative records.
2. Extract metadata from graph databases linking amendments to specific energy policies.
3. Perform semantic searches in vector databases to identify relevant unstructured text, such as congressional speeches or reports.

Thus, in return, the data source(s) 120 may return data 106 in multiple data formats and structures (e.g., structured, unstructured, vector, etc.), each set of return data 106 corresponding to one of the search query instructions 102.

In some embodiment, to formulate a candidate response for each search query instruction 102, the agent orchestration LLM 114 can compile the return data 106 into a single candidate response describing the return data 106 corresponding to the respective search query instruction 102. Because each search query instruction 102 may be different, as detailed above, the candidate response produced by the agent orchestration LLM 114 for each search query instruction 102 may also be different, with varying degrees of accuracy and relevancy to the original user request. Accordingly, each candidate response can be evaluated by the Data Verification LLM 116, which can validate and rank the results from each parallel search independently.

The system selects the highest-ranked result as the Selected Response 108, ensuring that the user receives the most valid and contextually relevant response. The Selected Response 108 is then presented to the user via the Computer 140.

Figure 2:
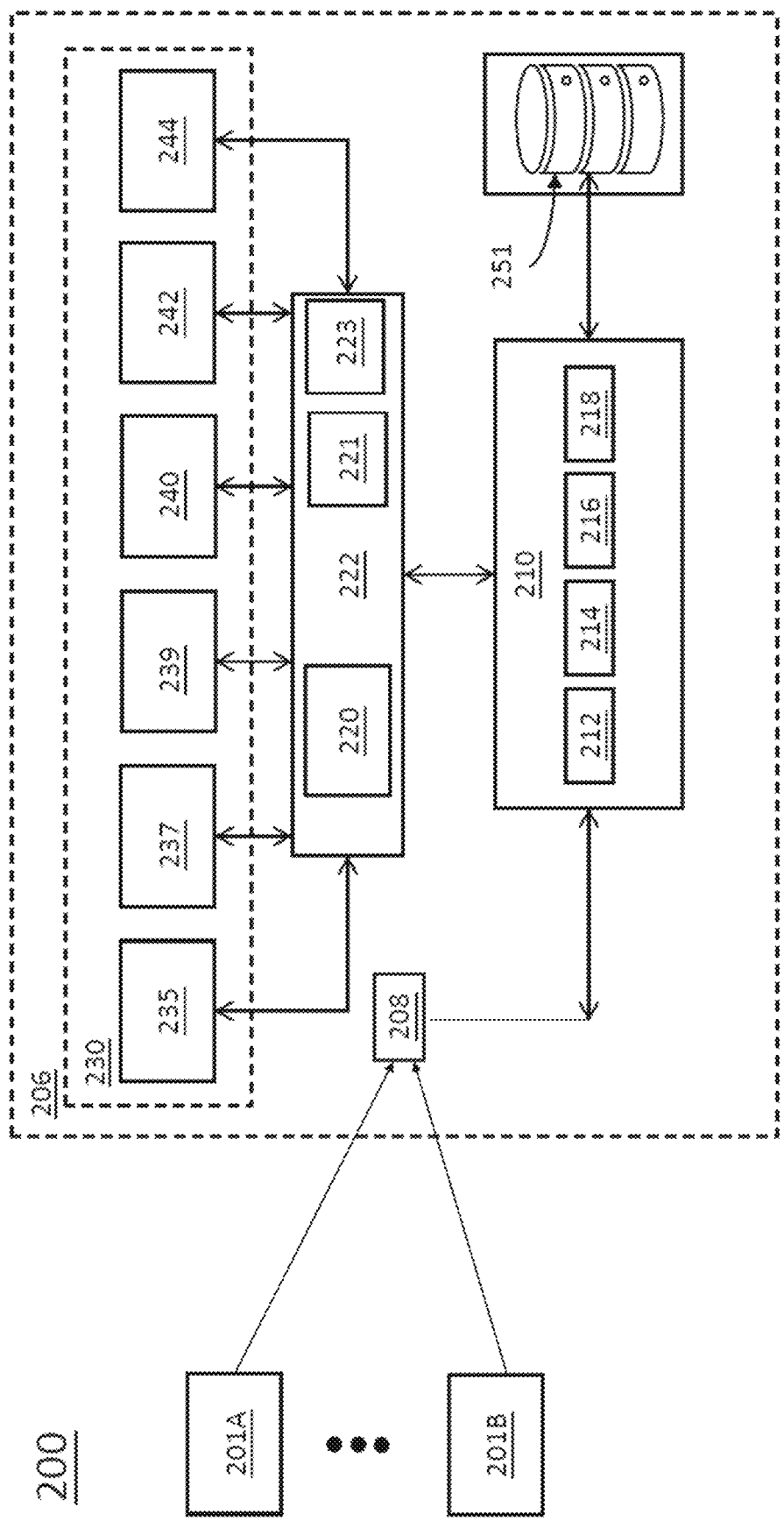
FIG. 2 is a block diagram illustrating an architecture of the QPR microservices platform for querying, processing, and ranking governmental data across heterogeneous databases in accordance with one or more embodiments of the present disclosure.

FIG. 2 is a block diagram of a first embodiment of a QPR system 200 of governmental data across heterogeneous databases implemented by a QPR microservices platform 206 in accordance with one or more embodiments of the present disclosure. Aspects of the present disclosure may be applied to any embodiment for the microservices platform 206 that may include software modules denoted 235, 237, 239, 240 and 244 for implementing the QPR platform microservices in a service layer 230 as described hereinbelow.

In some embodiments, the QPR microservices platform 206 may include a multi-layered architecture including, for example, the service layer 230, an orchestration layer 222, and a platform layer 210, however other layers may be additionally contemplated. In some embodiments, a plurality of data sources may interact with the QPR microservices platform 206 via any of N source devices denoted 201A . . . 201B, where N may be an integer. Communications from the source devices 201A . . . 201B may be received by a communication circuitry 208 and may then be routed to an appropriate component of the system, via the platform layer 210, for example.

In some embodiments, the platform layer 210 may include an input/output (I/O) interface 212 for facilitating data communication to external devices, such as, e.g., the communication circuitry 208 with any other system devices. The platform layer 210 may also include a runtime environment 214 for implementing programs, services, functionalities and microservices using a plurality of processors 216 and memory devices 218 in a plurality of computing machines such as the M computing machines for implementing the QPR microservices platform 206. The memory devices 218 may include, e.g., temporary storage and caching of data to facilitate resources of the QPR microservices platform 206.

In some embodiments, the orchestrator 220 may manage operations of the QPR microservices platform 206, including allocation of resources (e.g., add or removing any number of the computing machines) by a load balancer 223, process schedule with, e.g., the plurality of processors 216, among other tasks. For example, in some embodiments, the orchestrator 220 may include a plurality of application programming interfaces (APIs) 221 for calling services and functions of the QPR microservices platform 206 in interacting with the source devices 201A 201B.

In some embodiments, the orchestrator 220 may manage operations of microservices in a service layer 230 and coordination of the service layer 230 with the platform layer 210.

In some embodiments, the database 251 as described above may be separate from databases stored in the plurality of memories stored in the plurality of computing machines.

In some embodiments, any data stored the plurality of databases may be accessible from the N source devices 201A ... 201B via any of the plurality of APIs 221 in the orchestration layer 222 in the QPR microservices platform 206.

In some embodiments, the software modules 235, 237, 239, 240, 242, and 244 in FIG. 2 correspond to specific functionalities within the QPR System (Querying, Processing, and Ranking System) and may be directly related to the components of FIG. 1. These modules are implemented within the Service Layer (230) of the system architecture and interact with the Runtime Environment (214) in the Platform Layer (210) to execute the processes described in FIG. 1.

In some embodiments, a database population module 235 may be used for iteratively populating vector, relational, and/or graph databases with governmental data elements. This module may interact with components such as the data sources 120, the data ETL component, the graph extraction component, and the data enrichment faces and name recognition 110 to ensure that raw data may be transformed, enriched, and/or stored in the appropriate database formats.

In some embodiments, a user query processing module 237 may manage the initial processing of user queries by breaking them into smaller segments, applying named entity recognition (NER), tagging, and/or semantic analysis to optimize query execution. This module may be closely related to components such as process query into chunks and apply NER, tagging, etc., the semantic processing, and the enrich user's query, e.g., in the query prompt generation 322 component, which may collectively ensure accurate interpretation and modification of user queries.

In some embodiments, a query routing agent module 239 may implement the routing agent functionality, determining the data type and/or semantic scope of the user query and/or selecting appropriate specialized agents for query processing. This module may interact with components such as a routing agent, the Data Record Processing Agent(s) 112, the Data Verification Large Language Model 116, among other components or any combination thereof to route queries based on their scope and data requirements.

In some embodiments, a specialized query processing agents module 240 manages the execution of various specialized agents, including structured data agents, unstructured data agents, graph data agents, semantic search agents, validation agents, bias mitigation agents, and/or fallback agents. This module may be related to components such as the Data Record Processing Agent(s) 112 components, among other agents or any combination thereof which ensure that queries may be processed by the most suitable agents based on their context and requirements.

In some embodiments, a relevance scoring algorithms and/or machine learning model (MLM) module 242 may evaluate the relevance of query responses using a machine learning model trained on historical user queries and feedback. This module may interact with components such as Data Verification Large Language Model 116 to assign relevance scores and rank responses based on their alignment with the original user query.

Finally, in some embodiments, a graphic user interface (GUI) module 244 may control a display for formatting and delivering the ranked query responses to the user in user-friendly outputs, such as textual summaries, tables, and/or downloadable files. This module may be related to components such as a "convert response to narrative and table" component and then respond back to user components, which may ensure that the responses may be presented in a format aligned with the user's preferences and/or requirements. Together, these software modules and components form a cohesive system for querying, processing, and ranking governmental data across heterogeneous databases, leveraging the computational infrastructure provided by the Runtime Environment (214) to ensure efficient execution of processes.

Figure 3:
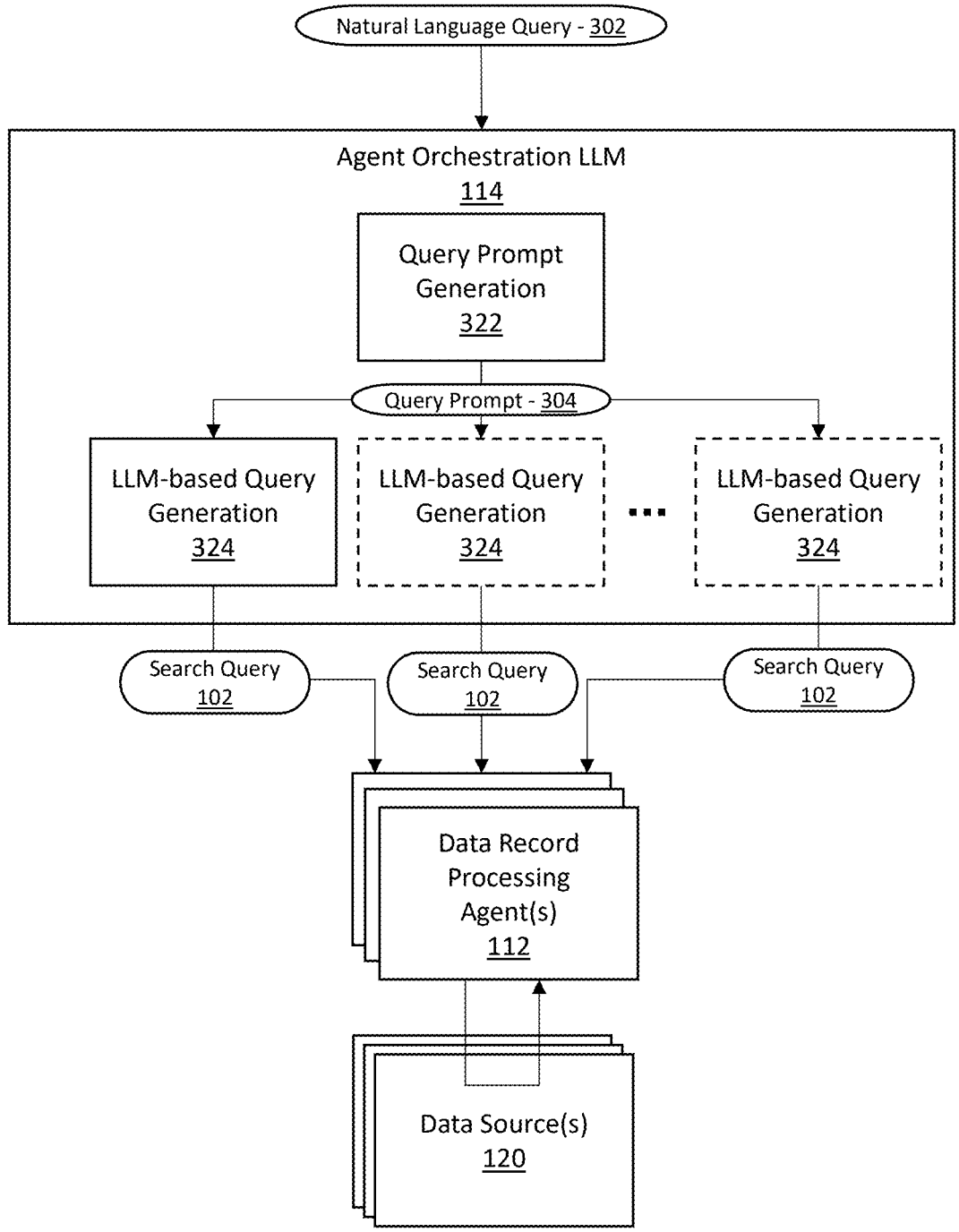
FIG. 3 is a schematic block diagram illustrating one embodiment of a system for orchestrating natural language queries using LLM-based agents and multi-source data processing in accordance with one or more embodiments of the present disclosure.

FIG. 3 is a schematic block diagram illustrating one embodiment of a system for orchestrating natural language queries using LLM-based agents and multi-source data processing in accordance with one or more embodiments of the present disclosure.

In some embodiments, referring to FIG. 3, a schematic block diagram is provided illustrating a system for orchestrating natural language queries via an agent orchestration large language model (LLM) 114 alongside multi-source data processing, in accordance with one or more embodiments of the present disclosure. In some embodiments, the system is configured to dynamically manage and route natural language queries 302 to multiple data processing modules 112 and 120.

In some embodiments, a natural language query 302 may be provided by a user, wherein such query includes the user's question or request for information, e.g., of governmental and/or legislative information, to the agent orchestration LLM 114 responsible for managing the query processing workflow. Within the agent orchestration LLM 114, a query prompt generation step 322 is performed which can transform the natural language query 302 into a query prompt 304. In some embodiments, this query prompt generation 322 enriches the original query by incorporating metadata, contextual information, and optimization parameters to ensure that the query is tailored for effective data retrieval across heterogeneous data sources 120 and/or via RAG using additional contextual data.

In some embodiments, once the query prompt 304 is generated, the query prompt 304 may be utilized by multiple instances of LLM-based query generation 324 as prompt for creation of search query instructions 102. In some embodiments, these instances operate in parallel or concurrently to produce three or more search query instructions 102. As a result, each LLM-based query generation 324 instance dynamically generates a search query instruction 102 based on the enriched query prompt 304.

In some embodiments, the search query instructions 102 are routed to the data record processing agent(s) 112, wherein such agents are specialized modules designed to interact with diverse data sources 120, including, for example, relational databases, vector databases, and graph databases. Accordingly, each data record processing agent 112 executes the search query instructions 102 to retrieve pertinent data records from the data sources 120. In some embodiments, the retrieved data is processed into search query responses which are subsequently returned to the agent orchestration LLM 114 for further refinement and validation.

In some embodiments, the Agent Orchestration Large Language Model (LLM) 114 is configured to generate the three or more search query instructions 102 to test multiple variations of a search query. This embodiment leverages the probabilistic nature of LLM-based query generation, where each search query instruction represents a unique variation tailored, intentionally or unintentionally, to explore different aspects of the user's natural language query 302.

Accordingly, in some embodiments, the Agent Orchestration LLM 114 performs the query prompt generation step 322, transforming the natural language query 302 into an enriched query prompt 304. This enrichment process incorporates metadata, contextual information, and optimization parameters to ensure the query is tailored for effective data retrieval. For example, the query prompt generation 322 can use Retrieval-Augmented Generation (RAG) techniques to enhance the precision and contextual relevance of responses by dynamically integrating structured and unstructured data sources during query processing. RAG can utilize a hybrid retrieval approach, combining semantic search mechanisms with exact word-match queries to maximize the comprehensiveness of retrieved information. For unstructured data, embeddings can be generated using pre-trained models to represent text chunks as numeric vectors, enabling efficient semantic similarity searches within vector databases. Concurrently, structured data queries can be optimized through SQL-based retrieval methods tailored to relational database schemas. The system further harmonizes these retrieval processes by leveraging a graph database to enrich queries with metadata, ensuring that the retrieved data aligns with the semantic intent of the user query. The query prompt 304 can be encriched and optimized to provide instruction to the agent orchestration LLM to elicit search query instructions 102 that effectuate searches of the data source(s) 120 across the multiple and heterogenous modalities while preserving the semantic intent of the natural language query 302.

Thus, in some embodiments, the Agent Orchestration LLM 114 may be prompted by the query prompt 304 to generate three or more search query instructions 102 based on the enriched query prompt 304. Due to the probabilistic nature of LLM-based query generation, each search query instruction represents a unique variation of the original query. These variations may differ in terms of:
  a. Search Attributes: Each instruction may target different attributes or entities within the data sources 120.
  b. Semantic Scope: Instructions may vary in their semantic focus, exploring different interpretations of the user's query.
  c. Data Source Type: Instructions may be optimized for specific types of data sources, such as relational databases, vector databases, or graph databases.

For example, a structured data query may include for example "Show me the latest vote in the House of Representatives." The system may then then retrieve voting records from relational databases, filtered by date to show the most recent vote. A second structured data query may include for example "Which Senator missed the most votes in the 118th Congress?" The system analyzes voting records to identify the Senator with the highest number of missed votes. A third structured data query may include for example "List all bills related to healthcare introduced in the Senate in the last month.". The system may then filter legislative records to provide a list of healthcare-related bills introduced within the specified timeframe.

In some embodiments, non-limiting examples of unstructured data queries may include a first exemplary query "What has Senator 1 said about national security on the Senate floor?" The system may then search unstructured speech transcripts stored in the 112 vector databases to find relevant mentions of "national security" by Senator 1. A second exemplary query "Provide a summary of the most recent congressional hearing on climate change." The system may retrieve and summarize unstructured data from hearing transcripts related to climate change.

In some embodiments, non-limiting examples of graph-based data queries may include a first exemplary query "Which members of Congress are cosponsors of the Green New Deal?" The system may uses the graph database to identify relationships between members of Congress and the Green New Deal bill. A second exemplary query may include "What committees are discussing tax reform this week?" The system may query the graph database to find committees associated with tax reform discussions based on recent metadata updates.

In some embodiments, non-limiting examples of complex queries where a first and second portion of the query may require structured data and unstructured data may include in a first exemplary query "What has Congress said about disaster relief funding for California in the last year?" The system may combine structured and unstructured data to retrieve voting records, legislative summaries, and speech transcripts related to disaster relief funding for California. A second exemplary query may include "Identify the top industries influencing Senator Schumer's voting pattern on taxes." The system may integrate lobbying disclosure data with voting records to analyze correlations between industries and voting patterns. A third exemplary query may include "Who worked for both Senator 1 and Senator 2?" The system may query congressional staff directories to identify individuals with employment histories in both offices.

In some embodiments, non-limiting examples of sentiment analysis queries may include in a first exemplary query "Analyze the sentiment of speeches by Senator 1 on immigration policy." The system may apply sentiment analysis to unstructured speech data to determine the tone and sentiment of Senator 1's statements on immigration. A second exemplary query may include "What is the overall sentiment of congressional discussions on renewable energy?" The system may aggregate sentiment analysis results from multiple speeches and hearings related to renewable energy.

In some embodiments, using the complex query "What has Congress said about disaster relief funding for California in the last year?" as an example, the LLM-based query generation 324, upon enrichment of the complex query, may output multiple independent search query instructions, such as:

A first example complex search query instruction can include:
  a. A Structured Database Query (Relational Database) for legislative records, such as bills, amendments, and voting data. The query is optimized using SQL to filter relevant data based on the topic and timeframe:

```sql
SELECT
    bill_title,
    bill_summary,
    amendment_details,
    voting_results,
    legislator_name,
    date
FROM
    legislative_records
```

```
        WHERE
            topic LIKE '%disaster relief%'
            AND location = 'California'
            AND date BETWEEN '2022-01-01' AND '2023-01-01';
``` i. Where this query retrieves bills, summaries, amendment details, voting results and legislator names related to disaster relief funding for California within the specified timeframe.

b. Unstructured Database Query (Vector Database) for congressional speeches, hearing transcripts, and reports, the semantic search being performed using embeddings to find text chunks that are semantically similar to the query. Example Python code for this semantic search in a vector database can include:

```
from vector_database import search_embeddings
query = "disaster relief funding for California in the last year"
results = search_embeddings(query, top_k=10)
``` i. Where this query retrieves the top 10 most relevant text chunks from the vector database, such as excerpts from speeches or hearing transcripts, based on semantic similarity to the query.

c. Graph Database Query (Metadata and Relationships) that includes metadata linking entities such as legislators, bills, committees, and topics. The query can be designed to identify relationships between disaster relief funding, California, and congressional actions, and includes the query:

```
graphql
query {
    disasterReliefFundingCalifornia(lastYear: true) {
        legislator {
            name
            party
        }
        bills {
            title
            summary
            date
        }
        committees {
            name
            actions {
                description
                date
            }
        }
    }
}
``` i. Where this query retrieves metadata about legislators, bills, and committee actions related to disaster relief funding for California in the last year, leveraging the graph database's ability to represent relationships and context.

A second example complex search query instruction can include:

a. A Structured Database Query (Relational Database) for legislative records, such as bills, amendments, and voting data. The query is optimized using SQL to filter relevant data based on the topic and timeframe:

```
sql
    SELECT
        bill_title,
        bill_summary,
        voting_results,
        date
    FROM
        legislative_records
    WHERE
        topic LIKE '%disaster relief%'
        AND location = 'California'
        AND date BETWEEN '2022-01-01' AND '2023-01-01';
``` i. Where this query retrieves bills, summaries, and voting results related to disaster relief funding for California within the specified timeframe.

b. Unstructured Database Query (Vector Database) for congressional speeches, hearing transcripts, and reports, the semantic search being performed using embeddings to find text chunks that are semantically similar to the query. Example Python code for this semantic search in a vector database can include:

```
from vector_database import search_embeddings
query = "disaster relief funding for California in the last year"
results = search_embeddings(query, top_k=50)
``` i. Where this query retrieves the top 50 most relevant text chunks from the vector database, such as excerpts from speeches or hearing transcripts, based on semantic similarity to the query.

c. Graph Database Query (Metadata and Relationships) that includes metadata linking entities such as legislators, bills, committees, and topics. The query can be designed to identify relationships between disaster relief funding, California, and congressional actions, and includes the query:

```
graphql
query {
    disasterReliefFundingCalifornia(lastYear: true) {
        legislator {
            name
            party
        }
        bills {
            title
            summary
            date
        }
        committees {
            name
            actions {
                description
                date
            }
        }
    }
}
``` i. Where this query retrieves metadata about legislators, bills, and committee actions related to disaster relief funding for California in the last year, leveraging the graph database's ability to represent relationships and context.

A third example complex search query instruction can include:

a. A Structured Database Query (Relational Database) for legislative records, such as bills, amendments, and voting data. The query is optimized using SQL to filter relevant data based on the topic and timeframe:

```sql
SELECT
    statement_text,
    legislator_name,
    committee_name,
    date
FROM
    legislative_records
WHERE
    topic LIKE '%disaster relief%'
    AND location = 'California'
    AND date BETWEEN '2022-01-01' AND '2023-01-01';
``` i. Where this query retrieves statements made by legislators, along with their names, associated committees, and dates, related to disaster relief funding for California within the specified timeframe.

b. Unstructured Database Query (Vector Database) for congressional speeches, hearing transcripts, and reports. Semantic search is performed using embeddings to find text chunks that are semantically similar to the query. Example Python code for this semantic search in a vector database can include:

```
from vector_database import search_embeddings
query = "disaster relief funding for California in the last year"
results = search_embeddings(query, top_k=50)
``` i. Where this query the top 15 most relevant text chunks from the vector database, such as excerpts from speeches or hearing transcripts, based on semantic similarity to the query. These results may include direct quotes or contextual mentions of disaster relief funding.

c. Graph Database Query (Metadata and Relationships) that includes metadata linking entities such as legislators, committees, bills, and topics. The query is designed to identify relationships between disaster relief funding, California, and congressional statements:

```graphql
query {
    disasterReliefFundingCalifornia(lastYear: true) {
        legislator {
            name
            party
        }
        statements {
            text
            date
        }
        committees {
            name
            actions {
                description
                date
            }
        }
    }
}
``` i. Where this query retrieves metadata about legislators, their statements, and committee actions related to disaster relief funding for California in the last year, leveraging the graph database's ability to represent relationships and context.

Accordingly, as exemplified above, the LLM-based query generation 324 may produce different query instructions that are similar but different, such as in whether the query searches for legislative acts or statements, or the number of results to return, among other details. By using multiple search query instructions 102, the data record processing agent(s) 112 may retrieve data from the data source(s) 120 for each variation such that the results received in return can be tested to determine which search query instruction 102 resulted in the greatest accuracy and relevance to the original natural language query 302.

Indeed, in some embodiments, multiple query generation provides comprehensive exploration that explores diverse aspects of the user's query, leading to more comprehensive results, while enabling the mitigation of LLM variability and hallucination due to the probabilistic nature of LLM-based query generation that ensures that the final response is both reliable and trustworthy, minimizing the impact of inaccuracies or biases.

Figure 4:
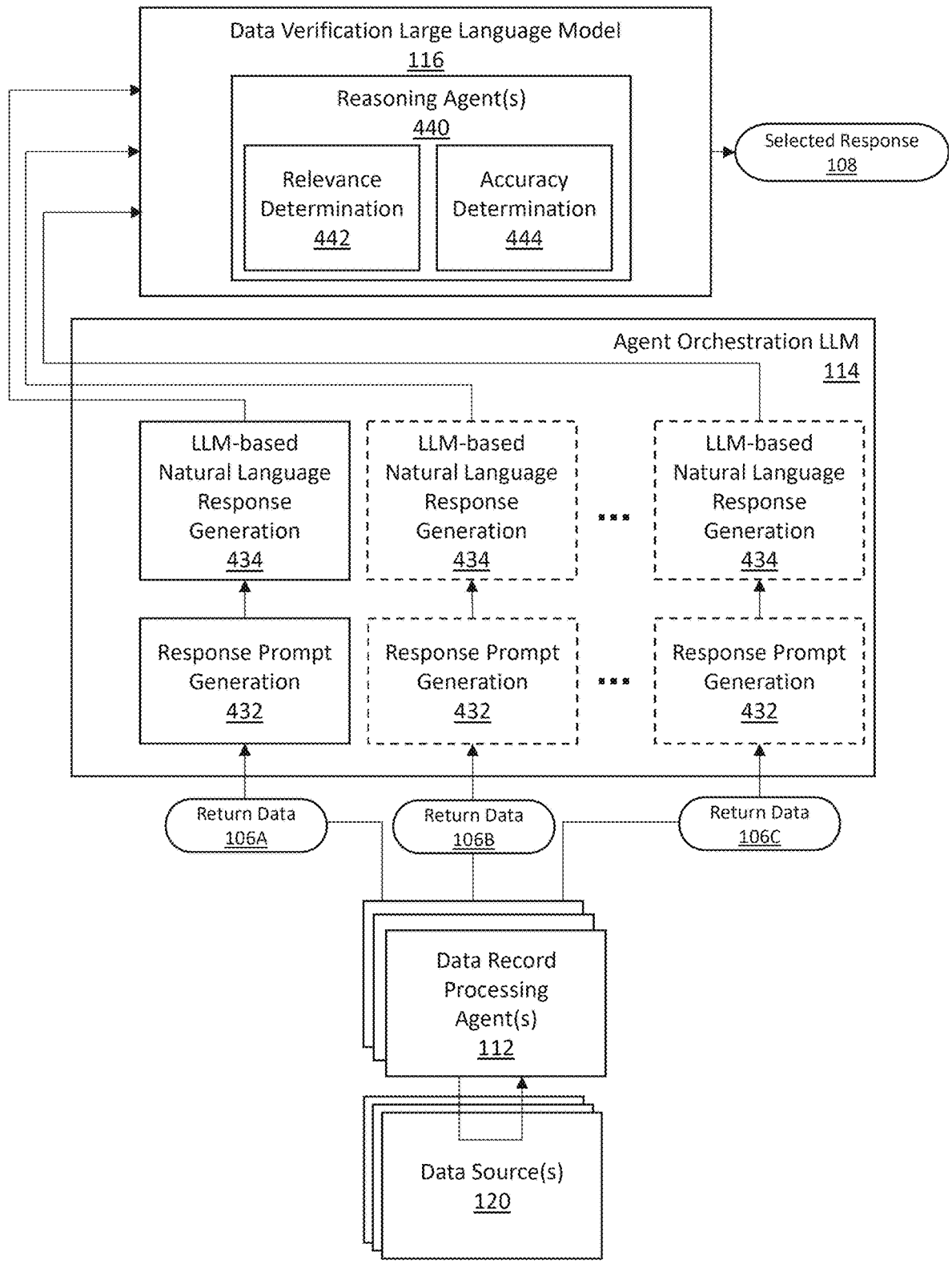
FIG. 4 is a schematic block diagram illustrating the system architecture for orchestrating multi-agent query processing and response generation in accordance with one or more embodiments of the present disclosure.

FIG. 4 is a schematic block diagram illustrating the system architecture for orchestrating multi-agent query processing and response generation in accordance with one or more embodiments of the present disclosure.

In some embodiments, referring to FIG. 4, the system architecture for orchestrating multi-agent query processing and response generation in accordance with one or more embodiments of the present disclosure is depicted. Here, FIG. 4 illustrates the interaction between various components involved in processing a user query, generating candidate responses, and selecting the most relevant and accurate response, including Data Verification Large Language Model 116, Reasoning Agent(s) 440, Relevance Determination 442, Accuracy Determination 444, Selected Response 108, Agent Orchestration LLM 114, LLM-based Natural Language Response Generation 434, Response Prompt Generation 432, Return Data 106A, 106B, and 106C, Data Record Processing Agent(s) 112, and Data Source(s) 120.

In some embodiments, the process commences with the data record processing agent(s) 112 executing search query instructions generated by the agent orchestration LLM 114. In alignment with these instructions, these agents interact with the data source(s) 120 to retrieve pertinent information. The retrieved data is represented as three distinct sets of return data—namely, return data 106A, return data 106B, and return data 106C—each corresponding to a specific search query instruction and containing data relevant to the attributes or entities specified in the query.

In some embodiments, the return data 106A, 106B, and 106C are then provided as input into the response prompt generation 432, which thereby creates prompts tailored to each set of return data. In this context, these prompts are designed to optimize the subsequent natural language response generation process by enriching the context and ensuring alignment with the original user query. Similar to the query prompt 304 of FIG. 3 above, each of the response prompt generation 432 can include the enrichment, e.g., using a RAG model or other enrichment technique, for each set of return data 106A-106C.

In some embodiments, the response prompts generated by the response prompt generation 432 are subsequently input into three or more instances of the LLM-based natural language response generation 434. Here, each instance processes its respective prompt to generate a candidate natural language response. Accordingly, these candidate responses represent the system's interpretation of the return data 106A, 106B, and 106C and are designed to provide user-friendly outputs that align with the semantic intent of the original query.

In some embodiments, after generation, the candidate natural language responses are input into the data verification large language model 116, which encompasses reasoning agent(s) 440. In this regard, the reasoning agent(s) 440 perform two analyses-specifically, the relevance determination 442 and the accuracy determination 444. As a result, the relevance determination 442 evaluates each candidate response for alignment with the original user query, ensuring that the response addresses the user's intent, while the accuracy determination 444 assesses the factual correctness of each response by cross-referencing data across data source(s) 120 and applying predefined accuracy metrics.

In some embodiments, the reasoning agent(s) 440 within the Data Verification Large Language Model (LLM) 116 can be configured to perform an accuracy determination 444 for input text, including the candidate responses. The accuracy determination 444 can include evaluating the factual correctness of the input text by cross-referencing it with data retrieved from multiple sources, applying predefined accuracy metrics, and identifying discrepancies or inconsistencies. The reasoning agent ensures that the final output aligns with the original query intent and adheres to factual standards.

In some embodiments, the reasoning agent(s) 440 receives input text, such as a candidate natural language response generated by the LLM-based natural language response generation 434. The input text represents the system's interpretation of the data retrieved from the Data Source(s) 120.

In some embodiments, the reasoning agent(s) 440 cross-references the input text with the original Return Data 106 retrieved from the Data Record Processing Agent(s) 112. Cross referencing can include structured data from relational databases, unstructured data from vector databases, and metadata from graph databases. The agent can determine that the claims or statements in the input text are supported by the underlying data.

In some embodiments, the reasoning agent(s) 440 applies predefined accuracy metrics to evaluate the factual correctness of the input text. These metrics may include: source consistency, data completeness and/or fact validation, among others or any combination thereof. Source consistency can include verifying that the input text aligns with the data retrieved from multiple sources and does not contradict verified records. Data completeness can include verifying that the input text includes all relevant information from the data sources without omitting critical details. Fact validation can include verifying that specific facts, such as dates, names, and numerical values, are accurate and match the original data.

In some embodiments, the reasoning agent(s) 440 can identify discrepancies or inconsistencies in the input text. For example, if the input text states that a legislator voted for a bill but the retrieved voting records indicate otherwise, the agent flags this as an error.

In some embodiments, the reasoning agent(s) 440 can resolve discrepancies by prioritizing data from the most reliable sources. For example, if conflicting information is found between two data sources, the agent may assign higher weight to the source with a verified track record or domain-specific reliability.

In some embodiments, the reasoning agent(s) 440 can assign an accuracy score to the input text based on the results of the evaluation. The score reflects the degree to which the input text adheres to factual standards and aligns with the original data.

In some embodiments, the reasoning agent(s) 440 provides the accuracy score and any flagged discrepancies to the Data Verification LLM 116 for further validation. The system can use the flagged information to refine the candidate responses and select the most accurate response as the Selected Response 108.

For example, for a candidate response stating, "Congress allocated $500 million for disaster relief funding in California in 2022," the reasoning agent(s) 440 can perform the following steps:

1. Cross-references the statement with structured data from relational databases containing legislative records.
2. Verifies the amount ($500 million) and the year (2022) against metadata from graph databases linking funding allocations to specific states.
3. Ensures that the statement aligns with unstructured data from vector databases, such as congressional speeches or reports discussing disaster relief funding.
4. Flags any discrepancies, such as conflicting amounts or dates, and resolves them by prioritizing the most reliable source.
5. Assigns an accuracy score based on the consistency and factual correctness of the statement.

By performing these steps, the reasoning agent(s) 440 ensures that the final response presented to the user is both accurate and trustworthy, enhancing the reliability of the system's outputs.

In some embodiments, a reasoning agent(s) 440 within the Data Verification Large Language Model (LLM) 116 is configured to perform a relevance determination 442 for input text. The relevance determination 442 can include evaluating the alignment of the input text with the semantic intent of the original user query of the natural language query 302 and ensuring that the response addresses the user's request comprehensively and appropriately. The reasoning agent(s) 440 ensures that the final output is contextually relevant and meaningful to the user. In some embodiments, the reasoning agent(s) 440 can receive input text, such as a candidate natural language response generated by the LLM-based natural language response generation 434. The input text represents the system's interpretation of the data retrieved from the Data Source(s) 120.

In some embodiments, the reasoning agent(s) 440 can compare the input text with the original user query 302 to evaluate its semantic alignment. This involves analyzing whether the response addresses the key elements of the query, such as the topic, scope, and specific attributes mentioned by the user.

In some embodiments, the reasoning agent(s) 440 can apply predefined relevance metrics to assess the contextual appropriateness of the input text. These metrics may include query coverage, focus consistency, semantic coherence, among others or any combination thereof. Query coverage can include validating that the input text addresses all aspects of the user query, including specific entities, attributes, or relationships mentioned. Focus consistency can include verifying that the input text remains focused on the user query without introducing irrelevant or extraneous information. Semantic coherence can include evaluating the logical flow and coherence of the input text in relation to the user query.

In some embodiments, the reasoning agent(s) 440 can perform keyword and entity matching to ensure that the input text includes references to critical terms or entities specified in the user query. For example, if the query mentions "disaster relief funding for California," the response must explicitly address "disaster relief," "funding," and "California."

In some embodiments, the reasoning agent(s) 440 can identify any gaps or omissions in the input text that may reduce its relevance to the user query. For instance, if the response fails to address a specific timeframe mentioned in the query, the agent flags this as a relevance issue.

In some embodiments, the reasoning agent(s) 440 can assign a relevance score to the input text based on the results of the evaluation. The score reflects the degree to which the input text aligns with the semantic intent of the user query and comprehensively addresses the user's request.

In some embodiments, the reasoning agent(s) 440 can output the relevance score and any flagged gaps or omissions to the Data Verification LLM 116 for further validation. The system uses this information to refine the candidate responses and select the most relevant response as the Selected Response 108.

For example, for a candidate response stating, "Congress allocated $500 million for disaster relief funding in California in 2022," the reasoning agent(s) 440 may perform the following steps:
1. Compares the response with the original query, "What has Congress said about disaster relief funding for California in the last year?"
2. Verifies that the response addresses the key elements of the query, including "disaster relief funding," "California," and the timeframe "last year."
3. Ensures that the response remains focused on the topic without introducing irrelevant information, such as unrelated funding allocations or legislative actions.
4. Flags any gaps, such as missing references to congressional statements or debates, and assigns a relevance score based on the comprehensiveness and alignment of the response with the query.

By performing these steps, the reasoning agent(s) 440 ensures that the final response presented to the user is contextually relevant and meaningful, enhancing the user experience and the utility of the system's outputs.

In some embodiments, the accuracy determination 444 and/or the relevance determination 442 can include statistical consistency analysis and/or linguistic consistency analysis.

In some embodiments, statistical consistency analysis includes a validation mechanism employed to ensure the coherence and reliability of responses generated by large language models (LLMs). This process involves evaluating the statistical alignment of candidate responses with expected patterns or distributions derived from the underlying data records. By detecting anomalies, such as outliers or conflicting data points, statistical consistency analysis helps identify inaccuracies or hallucinations in the generated outputs. The analysis leverages statistical methods to cross-reference responses against historical trends, numerical data, or predefined benchmarks, ensuring that the information presented is factually grounded and contextually appropriate. For example, when querying legislative data, statistical consistency analysis can verify that the response aligns with historical voting patterns or funding allocations, thereby improving the precision and trustworthiness of the system's outputs. This validation layer complements other mechanisms, such as linguistic consistency analysis, to enhance the overall reliability of the system, particularly in applications involving sensitive or regulated data.

In some embodiments, linguistic consistency analysis can include a validation mechanism designed to ensure that candidate natural language responses align with the semantic intent of the user query and the underlying data associated with the queried entity. This process evaluates the coherence, grammatical structure, and logical flow of the responses, identifying discrepancies or ambiguities that may arise due to limitations in large language models or the complexity of heterogeneous data sources. By systematically analyzing linguistic patterns, the system can detect and mitigate hallucinations, irrelevant information, or inconsistencies in the generated responses. Linguistic consistency analysis operates as a complementary validation layer alongside statistical consistency analysis, refining the accuracy and reliability of the system's outputs. For example, when responding to a query about legislative voting patterns, the system ensures that the language used in the response accurately reflects the relationships and context of the data, such as the alignment of voting records with party affiliations or historical trends. This validation mechanism is particularly advantageous in applications involving sensitive or regulated data, where precision, clarity, and trustworthiness are critical for decision-making processes.

In some embodiments, based on the analyses performed by the reasoning agent(s) 440, the reasoning agent(s) 440 can select the most relevant and accurate response from the candidate responses. In some embodiments, where there are multiple reasoning agent(s) 440, each reasoning agent may independently perform the analysis for accuracy and consistency on each candidate response. A consensus approach may then be implemented whereby the candidate response with the greatest number of "votes" of validity from the multiple reasoning agents 440 may be identified as the selected response 108. Thereafter, the selected response 108 is output as the final result, which is presented to the user via a graphical user interface or other suitable means.

In some embodiments, the architecture depicted in FIG. 4 highlights the modular and scalable design of the system. Accordingly, this design enables efficient processing of complex queries and ensures high precision and reliability in the generated responses, utilizing components such as the Data Verification Large Language Model 116, the Agent Orchestration LLM 114, and the Data Record Processing Agent(s) 112, along with the Relevance Determination 442 and Accuracy Determination 444 functionalities. The Selected Response 108 is generated through the LLM-based Natural Language Response Generation 434 and Response Prompt Generation 432, while the Return Data 106A, 106B, and 106C are sourced from the Data Source(s) 120.

Figure 5A:
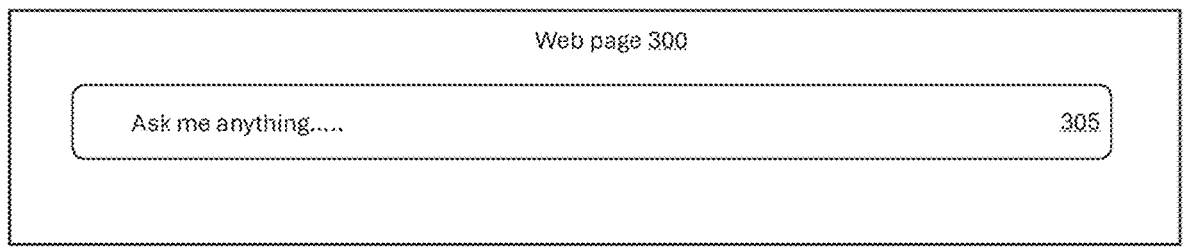
FIG. 5A illustrates a graphical user interface (GUI) of a web page for user query input in accordance with one or more embodiments of the present disclosure.

FIG. 5A is a graphic user interface (GUI) screenshot of a web page interface 500 in accordance with one or more embodiments of the present disclosure. The interface may include a search field 505 where users may input user queries (e.g., the user query 142) interact with the system. This search field may serve as the entry point for querying governmental data across heterogeneous databases, allowing users to submit queries intuitively without requiring technical expertise. For example, users may enter queries such as, "What has Congress said about renewable energy in the last year?" or "Show me the latest vote in the House of Representatives." Upon submission, the system may capture the query string and initiates the query processing workflow as shown in FIG. 1, leveraging components such as the routing agent 126 and specialized agents to determine the data type, semantic scope, and appropriate processing path. FIG. 5A illustrates the simplicity and accessibility of the user interface, which is designed to facilitate seamless interaction with the system while ensuring accurate and contextually relevant responses.

Figure 5B:
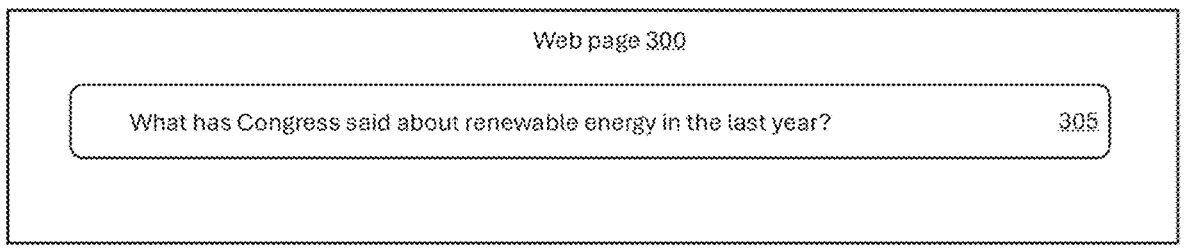
FIG. 5B illustrates a graphical user interface (GUI) screenshot depicting a query input field for submitting user queries to the system in accordance with one or more embodiments of the present disclosure.

FIG. 5B is a GUI screenshot of the same web page interface 500 in accordance with one or more embodiments of the present disclosure, showing an example user query entered into the search field 505. The exemplary user query may be entered into the search field 505 "What has Congress said about renewable energy in the last year?" Upon receiving the query, the system may process it using the routing agent 126 to determine the data type and semantic scope. The query may then be enriched by leveraging metadata extracted from the graph database and modified by specialized agents, such as the semantic search agent or structured data agent, depending on the query's requirements.

Figure 5C:
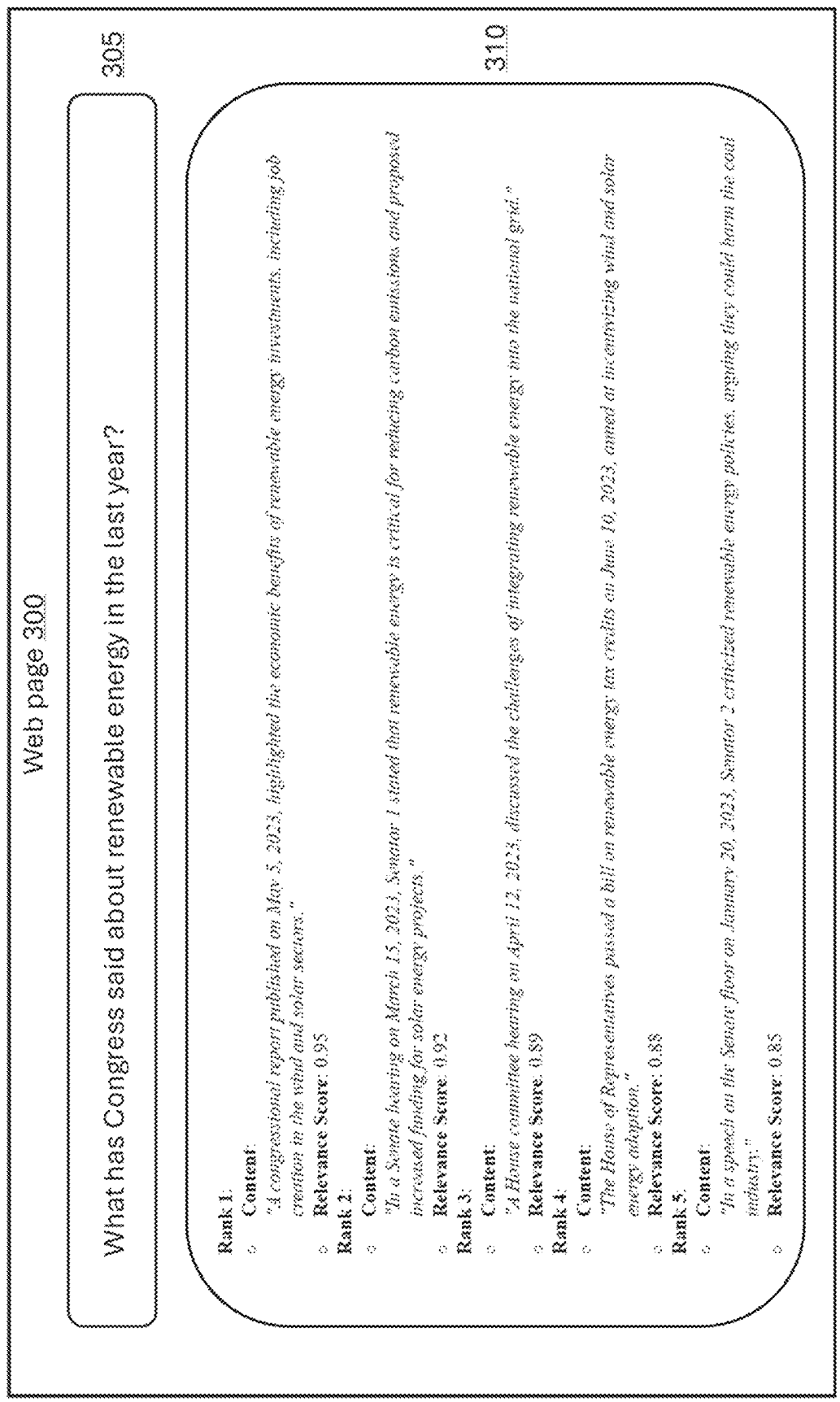
FIG. 5C illustrates a graphical user interface displaying ranked query responses with relevance scores based on a user query in accordance with one or more embodiments of the present disclosure.

FIG. 5C is a GUI screenshot of the web page interface 500 in accordance with one or more embodiments of the present disclosure, displaying ranked query responses 510 generated by the system based on the user query entered in FIG. 5B. The responses may be presented in a user-friendly format, with each response accompanied by a relevance score to indicate its alignment with the original query. For example, the ranked responses may include: "A congressional report published on May 5, 2023, highlighted the economic benefits of renewable energy investments, including job creation in the wind and solar sectors." (Relevance Score: 0.95), followed by other relevant responses ranked in descending order of relevance. The ranked responses are generated by the relevance machine learning model (242), which evaluates the responses based on their contextual alignment with the user query. FIG. 5C illustrates the system's ability to deliver accurate, contextually relevant, and prioritized results, enhancing the user experience and ensuring the utility of the system for governmental data analysis.

Figure 6:
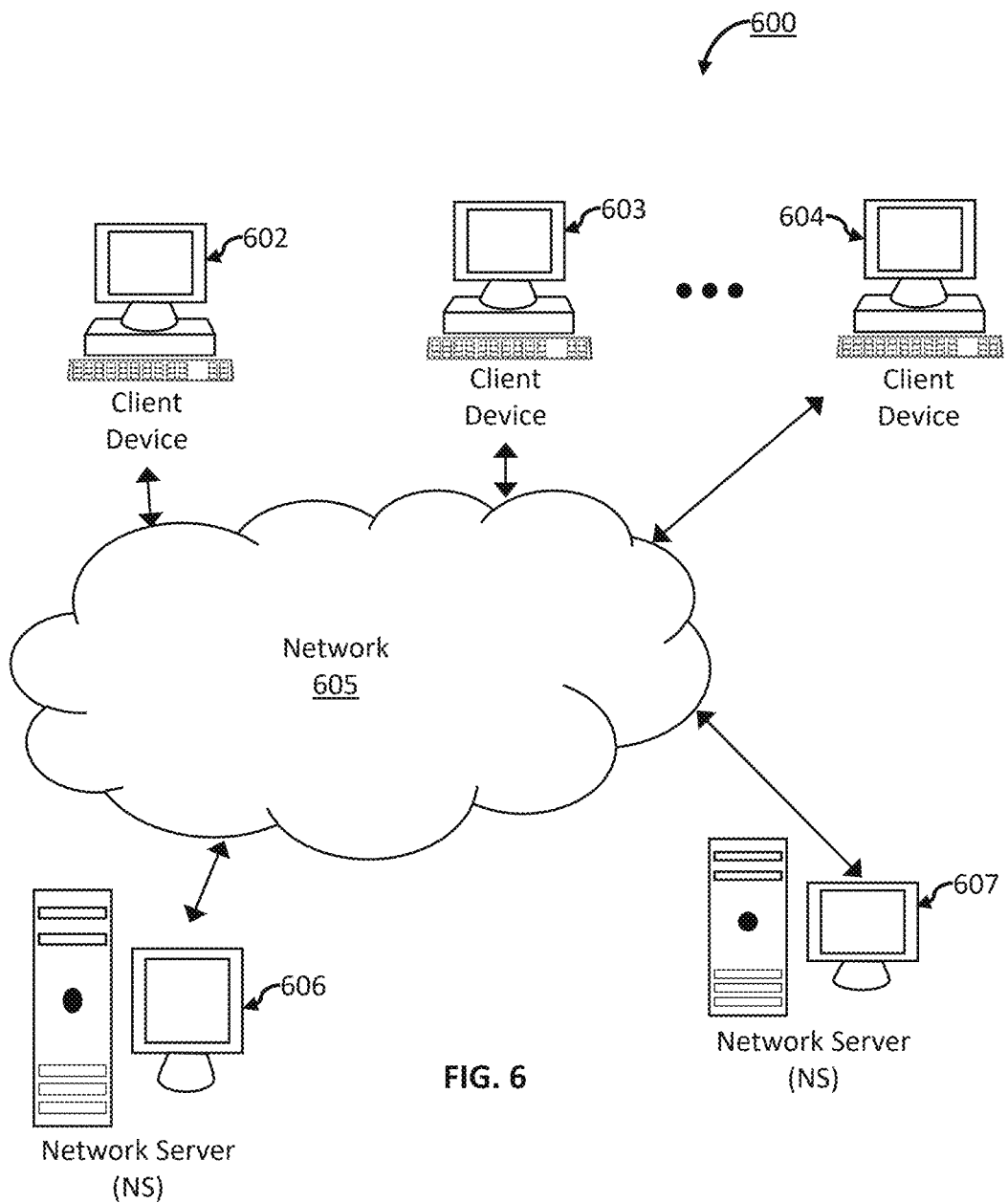
FIG. 6 is a schematic block diagram illustrating a representative network architecture for client-server communication in the system in accordance with one or more embodiments of the present disclosure.

FIG. 6 depicts a block diagram of an exemplary computer-based system and platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 600 may be configured to manage a large number of members and concurrent transactions, as detailed herein. In some embodiments, the exemplary computer-based system and platform 600 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 6, client device 602, client device 603 through client device 604 (e.g., clients) of the exemplary computer-based system and platform 600 may include virtually any computing device capable of receiving and sending a message over a network (e.g., cloud network), such as network 605, to and from another computing device, such as servers 606 and 607, each other, and the like. In some embodiments, the client devices 602 through 604 may be personal computers, multiprocessor systems, microprocessor-based or programmable consumer electronics, network PCs, and the like. In some embodiments, one or more client devices within client devices 602 through 604 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more client devices within client devices 602 through 604 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more client devices within client devices 602 through 604 may include may run one or more applications, such as Internet browsers, mobile applications, voice calls, video games, videoconferencing, and email, among others. In some embodiments, one or more client devices within client devices 602 through 604 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within client devices 602 through 604 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which is remotely downloadable by the user using network protocols such as FTP, SSH, or other file transfer mechanisms. In some embodiments, a client device may provide several levels of user interface, for example, advance user, standard user. In some embodiments, one or more client devices within client devices 602 through 604 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 605 may provide network access, data transport and/or other services to any computing device coupled to it. In some embodiments, the exemplary network 605 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 605 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 605 may include and implement, as an alternative or in conjunction with one or more of the above, a WiMAX architecture defined by the WiMAX forum. In some embodiments and, optionally, in combination of any embodiment described above or below, the exemplary network 605 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 605 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 605 may also include mass storage, such as network attached storage (NAS), a storage area network (SAN), a content delivery network (CDN) or other forms of computer or machine readable media.

In some embodiments, the exemplary server 606 or the exemplary server 607 may be a web server (or a series of servers) running a network operating system, examples of which may include but are not limited to Apache on Linux or Microsoft IIS (Internet Information Services). In some embodiments, the exemplary server 606 or the exemplary server 607 may be used for and/or provide cloud and/or network computing. Although not shown in FIG. 6, in some embodiments, the exemplary server 606 or the exemplary server 607 may have connections to external systems like email, SMS messaging, text messaging, ad content providers, etc. Any of the features of the exemplary server 606 may be also implemented in the exemplary server 607 and vice versa.

In some embodiments, one or more of the exemplary servers 606 and 607 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the client devices 601 through 604.

In some embodiments and, optionally, in combination of any embodiment described above or below, for example, one or more exemplary computing client devices 602 through 604, the exemplary server 606, and/or the exemplary server 607 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 7:
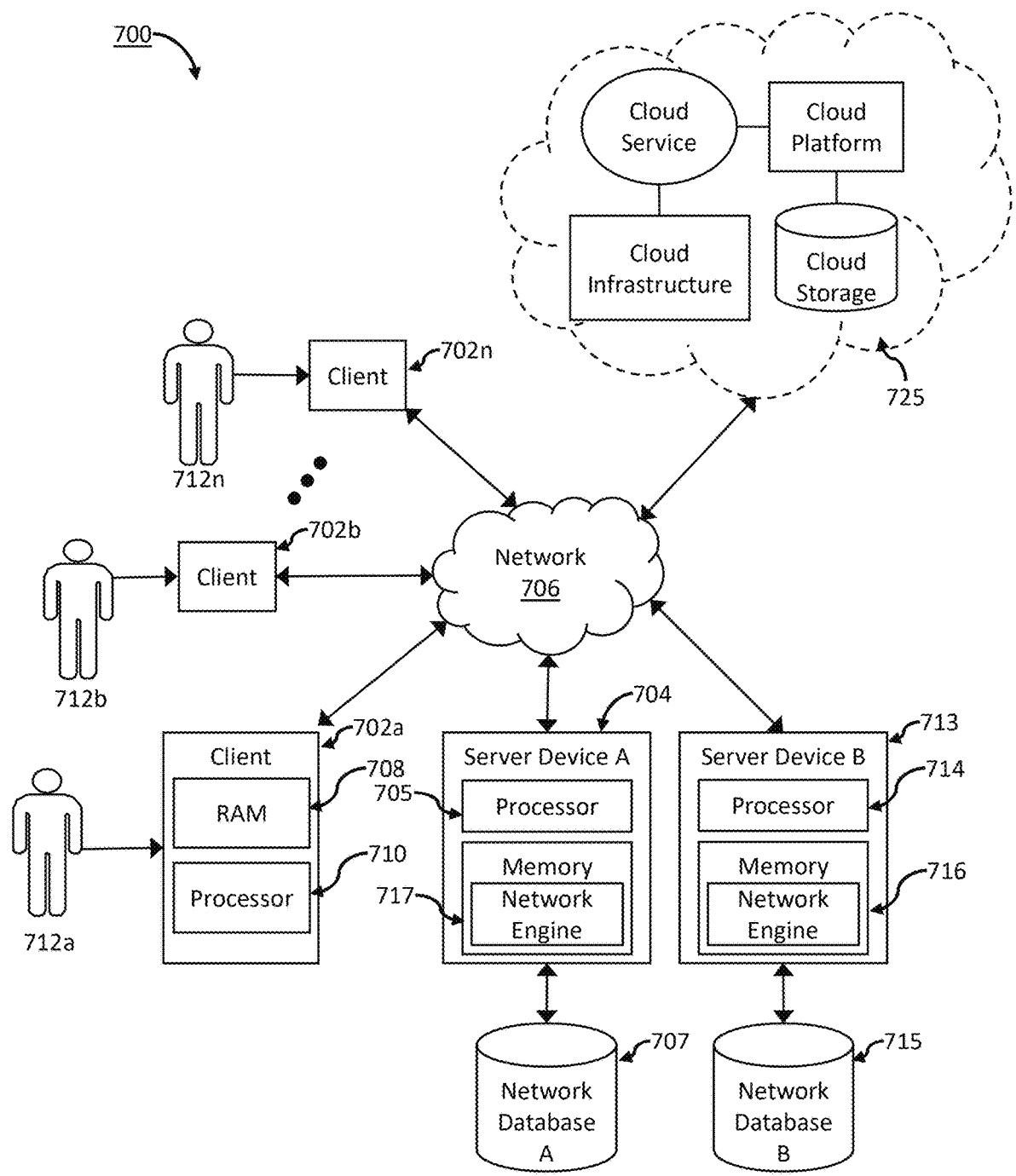
FIG. 7 is a schematic block diagram illustrating a distributed network architecture for querying, processing, and ranking data across heterogeneous databases in accordance with one or more embodiments of the present disclosure.

FIG. 7 depicts a block diagram of another exemplary computer-based system and platform 700 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the client device 702a, client device 702b through client device 702n shown each at least includes a computer-readable medium, such as a random-access memory (RAM) 708 coupled to a processor 710 or FLASH memory. In some embodiments, the processor 710 may execute computer-executable program instructions stored in memory 708. In some embodiments, the processor 710 may include a microprocessor, an ASIC, and/or a state machine. In some embodiments, the processor 710 may include, or may be in communication with, media, for example computer-readable media, which stores instructions that, when executed by the processor 710, may cause the processor 710 to perform one or more steps described herein. In some embodiments, examples of computer-readable media may include, but are not limited to, an electronic, optical, magnetic, or other storage or transmission device capable of providing a processor, such as the processor 710 of client device 702a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, client devices 702a through 702n may also comprise a number of external or internal devices such as a mouse, a CD-ROM, DVD, a physical or virtual keyboard, a display, or other input or output devices. In some embodiments, examples of client devices 702a through 702n (e.g., clients) may be any type of processor-based platforms that are connected to a network 706 such as, without limitation, personal computers, digital assistants, personal digital assistants, smart phones, pagers, digital tablets, laptop computers, Internet appliances, and other processor-based devices. In some embodiments, client devices 702a through 702n may be specifically programmed with one or more application programs in accordance with one or more principles/methodologies detailed herein. In some embodiments, client devices 702a through 702n may operate on any operating system capable of supporting a browser or browser-enabled application, such as Microsoft™, Windows™, and/or Linux. In some embodiments, client devices 702a through 702n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 702a through 702n, user 712a, user 712b through user 712n, may communicate over the exemplary network 706 with each other and/or with other systems and/or devices coupled to the network 706. As shown in FIG. 7, exemplary server devices 704 and 713 may include processor 705 and processor 714, respectively, as well as memory 717 and memory 716, respectively. In some embodiments, the server devices 704 and 713 may be also coupled to the network 706. In some embodiments, one or more client devices 702a through 702n may be mobile clients.

In some embodiments, at least one database of exemplary databases 707 and 715 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
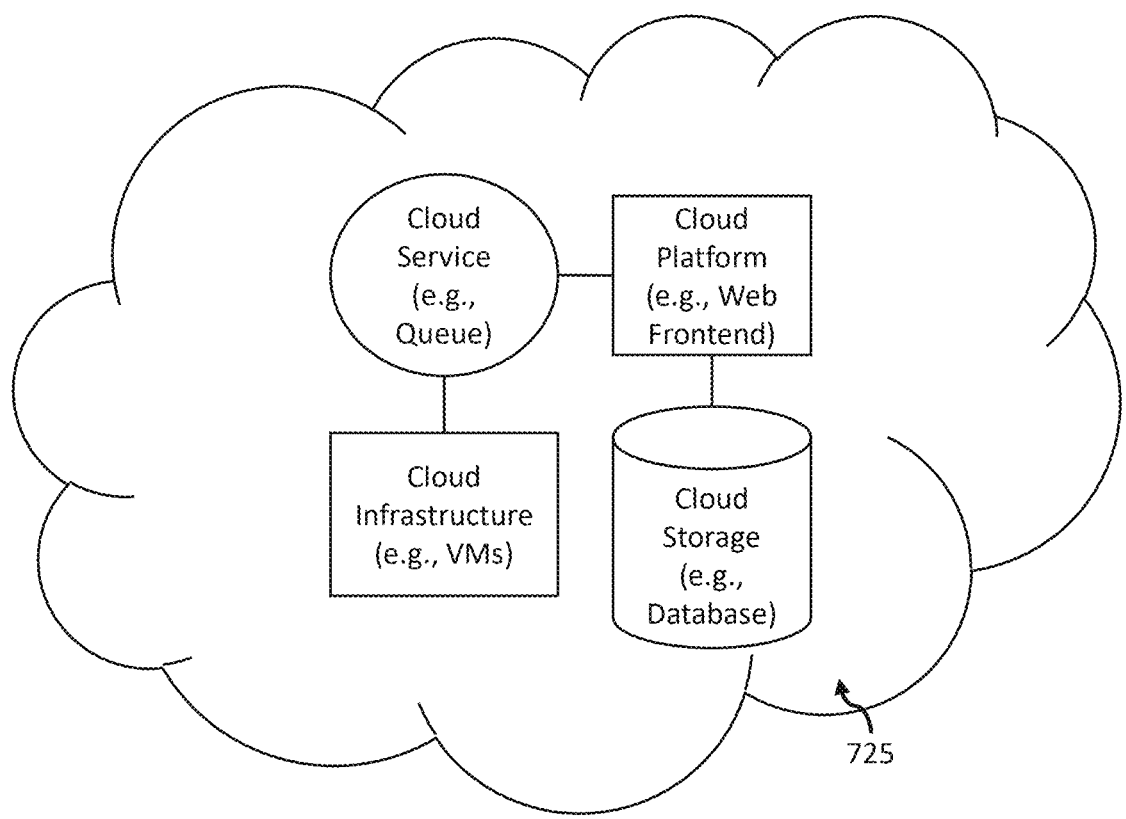
FIG. 8 is a schematic block diagram illustrating the cloud-based architecture supporting the system's operational components in accordance with one or more embodiments of the present disclosure.
Figure 9:
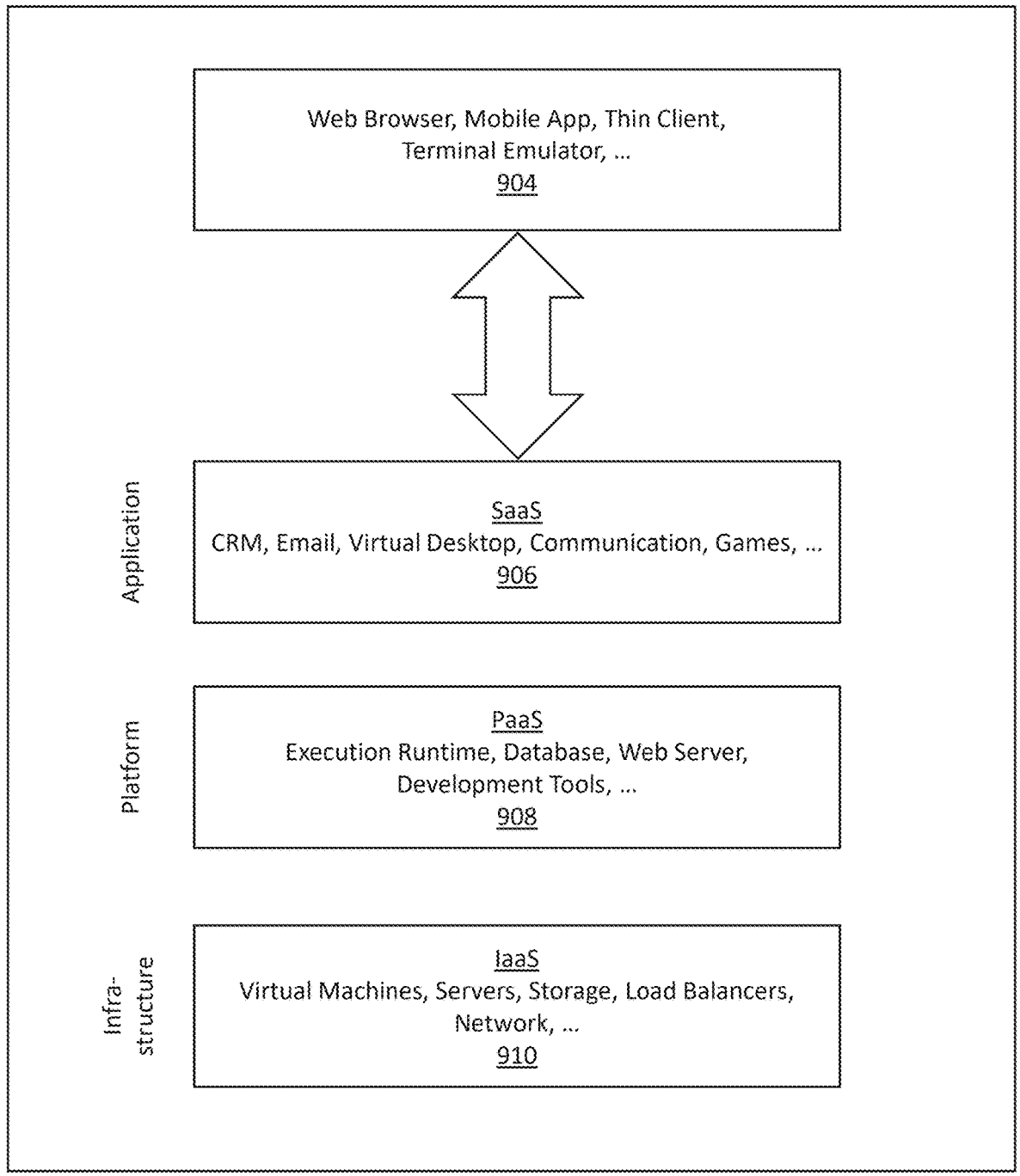
FIG. 9 is a schematic block diagram illustrating the layered architecture of a cloud computing system, comprising application, platform, and infrastructure services, in accordance with one or more embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 725 such as, but not limiting to: infrastructure a service (IaaS) 910, platform as a service (PaaS) 908, and/or software as a service (SaaS) 906 using a web browser, mobile app, thin client, terminal emulator or other endpoint 904. FIGS. 8 and 9 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) Open VMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

Clause 1. A method including: receiving, by at least one processor from at least one user computing device associated with a user, a user-provided query including a natural language request to perform retrieve information associated with at least one data record; where the at least one data record includes at least one attribute associated with at least one entity; inputting, by the at least one processor, the natural language request of the query as a query prompt into an agent orchestration large language model to output a plurality of search query instructions to at least one data record processing agent of a plurality of data record processing agents based at least in part on trained parameters of the agent orchestration large language model; where the at least one data record processing agent includes at least one data record identification machine learning model configured to search a plurality of data sources of data records based at least in part on the plurality of search query instructions; inputting, by the at least one processor, the plurality of search query instructions, including the at least one attribute associated with the at least one entity, into the at least one data record processing agent to output a plurality of search query responses; where the plurality of search query responses include data associated with the at least one entity; where each response of the plurality of responses correspond to a search query instruction of the plurality of search query instructions; inputting, by the at least one processor, at least one search query response prompt, including the plurality of search query responses and the natural language request, into the agent orchestration large language model to output a plurality of candidate natural language responses representative of the plurality of search query responses based at least in part on trained parameters of the agent orchestration large language model; inputting, by the at least one processor, the plurality of candidate natural language responses and the natural language request into at least one data verification large language model to output a verified response of the plurality of candidate natural language responses; where the at least one data verification large language model is trained to select the verified response from the plurality of candidate natural language responses that is: most relevant of the plurality of candidate natural language responses to the natural language request based at least in part on at least one relevance metric, and accurate relative to the at least one data record to mitigate hallucinations based at least in part on at least one accuracy metric; causing to display, by the at least one processor, the verified natural language response in a graphical user interface (GUI) rendered on the user computing device.

Clause 2. The method of clause 1, where the at least one data verification large language model is a plurality of data verification large language models.

Clause 3. The method of clause 2, further including: obtaining, from each data verification large language model of the plurality of data verification large language models, a respective verified natural language response of a plurality of verified natural language responses; determining a particular verified natural language response having been output by a most number of the plurality of data verification large language models; and selecting the particular verified natural language response as the verified natural language response.

Clause 4. The method of clause 1, where the at least one data verification large language model is trained to select the verified response from the plurality of candidate natural language responses based at least in part on a weighting of each data source of a plurality of data sources.

Clause 5. The method of clause 1, further including: validating, by the at least one processor, the data associated with the at least one entity returned by a first data record processing agent of the at least one data record processing agent with the data associated with the at least one entity returned by a second data record processing agent of the at least one data record processing agent; where the at least one data record processing agent is a plurality of data record processing agent.

Clause 6. The method of clause 1, further including: determining, by the at least one processor, a weighting to each data record processing agent; where the at least one data record processing agent is a plurality of data record processing agent; applying, by the at least one processor, the weighting to the data returned by each data record processing agent; and determining, by the at least one processor, verified data of the data associated with the at least one entity based at least in part on scoring the data using the weighting.

Clause 7. The method of clause 1, further including: utilizing, by the at least one processor, at least one statistical consistency analysis to determine, based at least in part on the data associated with the at least one entity and the natural language request, a statistical consistency of each candidate natural language response of the plurality of candidate natural language responses.

Clause 8. The method of clause 1, further including: utilizing, by the at least one processor, at least one linguistic consistency analysis to determine, based at least in part on the data associated with the at least one entity and the natural language request, a linguistic consistency of each candidate natural language response of the plurality of candidate natural language responses.

Clause 9. The method of clause 1, where the plurality of candidate natural language responses includes at least one of: textual summaries, tables, downloadable files, or any combination thereof.

Clause 10. The method of clause 1, where the data includes governmental data associated with a plurality of governmental data sources.

Clause 11. A system including: at least one processor in communication with at least one non-transitory computer readable medium having software instructions stored thereon, where the at least one processor, upon execution of the software instructions, is configured to: receive, from at least one user computing device associated with a user, a user-provided query including a natural language request to perform retrieve information associated with at least one data record; where the at least one data record includes at least one attribute associated with at least one entity; input the natural language request of the query as a query prompt into an agent orchestration large language model to output a plurality of search query instructions to at least one data record processing agent of a plurality of data record processing agents based at least in part on trained parameters of the agent orchestration large language model; where the at least one data record processing agent includes at least one data record identification machine learning model configured to search a plurality of data sources of data records based at least in part on the plurality of search query instructions; input the plurality of search query instructions, including the at least one attribute associated with the at least one entity, into the at least one data record processing agent to output a plurality of search query responses; where the plurality of search query responses include data associated with the at least one entity; where each response of the plurality of responses correspond to a search query instruction of the plurality of search query instructions; input at least one search query response prompt, including the plurality of search query responses and the natural language request, into the agent orchestration large language model to output a plurality of candidate natural language responses representative of the plurality of search query responses based at least in part on trained parameters of the agent orchestration large language model; input the plurality of candidate natural language responses and the natural language request into at least one data verification large language model to output a verified response of the plurality of candidate natural language responses; where the at least one data verification large language model is trained to select the verified response from the plurality of candidate natural language responses that is: most relevant of the plurality of candidate natural language responses to the natural language request based at least in part on at least one relevance metric, and accurate relative to the at least one data record to mitigate hallucinations based at least in part on at least one accuracy metric; cause to display the verified natural language response in a graphical user interface (GUI) rendered on the user computing device.

Clause 12. The system of clause 11, where the at least one data verification large language model is a plurality of data verification large language models.

Clause 13. The system of clause 12, where the at least one processor, upon execution of the software instructions, is further configured to: obtain, from each data verification large language model of the plurality of data verification large language models, a respective verified natural language response of a plurality of verified natural language responses; determine a particular verified natural language response having been output by a most number of the plurality of data verification large language models; and select the particular verified natural language response as the verified natural language response.

Clause 14. The system of clause 11, where the at least one data verification large language model is trained to select the verified response from the plurality of candidate natural language responses based at least in part on a weighting of each data source of a plurality of data sources.

Clause 15. The system of clause 11, where the at least one processor, upon execution of the software instructions, is further configured to: validate the data associated with the at least one entity returned by a first data record processing agent of the at least one data record processing agent with the data associated with the at least one entity returned by a second data record processing agent of the at least one data record processing agent; where the at least one data record processing agent is a plurality of data record processing agent.

Clause 16. The system of clause 11, where the at least one processor, upon execution of the software instructions, is further configured to: determine a weighting to each data record processing agent; where the at least one data record processing agent is a plurality of data record processing agent; apply the weighting to the data returned by each data record processing agent; and determine verified data of the data associated with the at least one entity based at least in part on scoring the data using the weighting.

Clause 17. The system of clause 11, where the at least one processor, upon execution of the software instructions, is further configured to: utilize at least one statistical consistency analysis to determine, based at least in part on the data associated with the at least one entity and the natural language request, a statistical consistency of each candidate natural language response of the plurality of candidate natural language responses.

Clause 18. The system of clause 11, where the at least one processor, upon execution of the software instructions, is further configured to: utilize least one linguistic consistency analysis to determine, based at least in part on the data associated with the at least one entity and the natural language request, a linguistic consistency of each candidate natural language response of the plurality of candidate natural language responses.

Clause 19. The system of clause 11, where the plurality of candidate natural language responses includes at least one of: textual summaries, tables, downloadable files, or any combination thereof.

Clause 20. The system of clause 11, where the data includes governmental data associated with a plurality of governmental data sources.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:
1. A method comprising:
receiving, by at least one processor from at least one user computing device associated with a user, a user-provided query comprising a natural language request to perform retrieve information associated with at least one data record;
wherein the at least one data record comprises at least one attribute associated with at least one entity;

inputting, by the at least one processor, the natural language request of the query as a query prompt into an agent orchestration large language model to output a plurality of search query instructions to at least one data record processing agent of a plurality of data record processing agents based at least in part on trained parameters of the agent orchestration large language model;
  wherein the at least one data record processing agent comprises at least one data record identification machine learning model configured to search a plurality of data sources of data records based at least in part on the plurality of search query instructions;
inputting, by the at least one processor, the plurality of search query instructions, including the at least one attribute associated with the at least one entity, into the at least one data record processing agent to output a plurality of search query responses;
  wherein the plurality of search query responses comprise data associated with the at least one entity;
  wherein each response of the plurality of responses correspond to a search query instruction of the plurality of search query instructions;
inputting, by the at least one processor, at least one search query response prompt, comprising the plurality of search query responses and the natural language request, into the agent orchestration large language model to output a plurality of candidate natural language responses representative of the plurality of search query responses based at least in part on trained parameters of the agent orchestration large language model;
inputting, by the at least one processor, the plurality of candidate natural language responses and the natural language request into each data verification large language model of the plurality of data verification large language models to output a respective verified response of a plurality of verified natural language responses in response to the plurality of candidate natural language responses;
  wherein each verification large language model is trained to select the respective verified response from the plurality of candidate natural language responses that is:
    most relevant of the plurality of candidate natural language responses to the natural language request based at least in part on at least one relevance metric, and
    accurate relative to the at least one data record to mitigate hallucinations based at least in part on at least one accuracy metric;
determining a particular verified natural language response having been output by a most number of the plurality of data verification large language models;
selecting the particular verified natural language response as the verified natural language response; and
causing to display, by the at least one processor, the verified natural language response in a graphical user interface (GUI) rendered on the user computing device.

2. The method of claim 1, wherein the at least one data verification large language model is a plurality of data verification large language models.

3. The method of claim 1, wherein the at least one data verification large language model is trained to select the verified response from the plurality of candidate natural language responses based at least in part on a weighting of each data source of a plurality of data sources.

4. The method of claim 1, further comprising:
validating, by the at least one processor, the data associated with the at least one entity returned by a first data record processing agent of the at least one data record processing agent with the data associated with the at least one entity returned by a second data record processing agent of the at least one data record processing agent;
  wherein the at least one data record processing agent is a plurality of data record processing agent.

5. The method of claim 1, further comprising:
determining, by the at least one processor, a weighting to each data record processing agent;
  wherein the at least one data record processing agent is a plurality of data record processing agent;
applying, by the at least one processor, the weighting to the data returned by each data record processing agent; and
determining, by the at least one processor, verified data of the data associated with the at least one entity based at least in part on scoring the data using the weighting.

6. The method of claim 1, further comprising:
utilizing, by the at least one processor, at least one statistical consistency analysis to determine, based at least in part on the data associated with the at least one entity and the natural language request, a statistical consistency of each candidate natural language response of the plurality of candidate natural language responses.

7. The method of claim 1, further comprising:
utilizing, by the at least one processor, at least one linguistic consistency analysis to determine, based at least in part on the data associated with the at least one entity and the natural language request, a linguistic consistency of each candidate natural language response of the plurality of candidate natural language responses.

8. The method of claim 1, wherein the plurality of candidate natural language responses comprises at least one of: textual summaries, tables, downloadable files, or any combination thereof.

9. The method of claim 1, wherein the data comprises governmental data associated with a plurality of governmental data sources.

10. A system comprising:
at least one processor in communication with at least one non-transitory computer readable medium having software instructions stored thereon, wherein the at least one processor, upon execution of the software instructions, is configured to:
  receive, from at least one user computing device associated with a user, a user-provided query comprising a natural language request to perform retrieve information associated with at least one data record;
    wherein the at least one data record comprises at least one attribute associated with at least one entity;
  input the natural language request of the query as a query prompt into an agent orchestration large language model to output a plurality of search query instructions to at least one data record processing agent of a plurality of data record processing agents based at least in part on trained parameters of the agent orchestration large language model;
    wherein the at least one data record processing agent comprises at least one data record identification machine learning model configured to search a plurality of data sources of data records based at least in part on the plurality of search query instructions;

input the plurality of search query instructions, including the at least one attribute associated with the at least one entity, into the at least one data record processing agent to output a plurality of search query responses;

wherein the plurality of search query responses comprise data associated with the at least one entity;

wherein each response of the plurality of responses correspond to a search query instruction of the plurality of search query instructions;

input at least one search query response prompt, comprising the plurality of search query responses and the natural language request, into the agent orchestration large language model to output a plurality of candidate natural language responses representative of the plurality of search query responses based at least in part on trained parameters of the agent orchestration large language model;

input the plurality of candidate natural language responses and the natural language request into each data verification large language model of the plurality of data verification large language models to output a respective verified response of a plurality of verified natural language responses in response to the plurality of candidate natural language responses;

wherein each verification large language model is trained to select the respective verified response from the plurality of candidate natural language responses that is:

most relevant of the plurality of candidate natural language responses to the natural language request based at least in part on at least one relevance metric, and accurate relative to the at least one data record to mitigate hallucinations based at least in part on at least one accuracy metric;

determine a particular verified natural language response having been output by a most number of the plurality of data verification large language models;

select the particular verified natural language response as the verified natural language response; and cause to display the verified natural language response in a graphical user interface (GUI) rendered on the user computing device.

11. The system of claim 10, wherein the at least one data verification large language model is a plurality of data verification large language models.

12. The system of claim 10, wherein the at least one data verification large language model is trained to select the verified response from the plurality of candidate natural language responses based at least in part on a weighting of each data source of a plurality of data sources.

13. The system of claim 10, wherein the at least one processor, upon execution of the software instructions, is further configured to:

validate the data associated with the at least one entity returned by a first data record processing agent of the at least one data record processing agent with the data associated with the at least one entity returned by a second data record processing agent of the at least one data record processing agent;

wherein the at least one data record processing agent is a plurality of data record processing agent.

14. The system of claim 10, wherein the at least one processor, upon execution of the software instructions, is further configured to:

determine a weighting to each data record processing agent;

wherein the at least one data record processing agent is a plurality of data record processing agent;

apply the weighting to the data returned by each data record processing agent; and determine verified data of the data associated with the at least one entity based at least in part on scoring the data using the weighting.

15. The system of claim 10, wherein the at least one processor, upon execution of the software instructions, is further configured to:

utilize at least one statistical consistency analysis to determine, based at least in part on the data associated with the at least one entity and the natural language request, a statistical consistency of each candidate natural language response of the plurality of candidate natural language responses.

16. The system of claim 10, wherein the at least one processor, upon execution of the software instructions, is further configured to:

utilize least one linguistic consistency analysis to determine, based at least in part on the data associated with the at least one entity and the natural language request, a linguistic consistency of each candidate natural language response of the plurality of candidate natural language responses.

17. The system of claim 10, wherein the plurality of candidate natural language responses comprises at least one of: textual summaries, tables, downloadable files, or any combination thereof.

18. The system of claim 10, wherein the data comprises governmental data associated with a plurality of governmental data sources.

* * * * *